United States Patent
Kondapi et al.

(10) Patent No.: US 12,425,423 B2
(45) Date of Patent: Sep. 23, 2025

(54) SECURITY-LINKED TELEMETRY IN A ZERO-TRUST COMPUTING ENVIRONMENT

(71) Applicant: Dell Products, L.P., Round Rock, TX (US)

(72) Inventors: Srikanth Kondapi, Austin, TX (US); Balasingh P. Samuel, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 108 days.

(21) Appl. No.: 18/542,831

(22) Filed: Dec. 18, 2023

(65) Prior Publication Data

US 2025/0202909 A1 Jun. 19, 2025

(51) Int. Cl.
*H04L 9/40* (2022.01)

(52) U.S. Cl.
CPC .......... *H04L 63/1416* (2013.01); *H04L 63/20* (2013.01)

(58) Field of Classification Search
CPC ............................ H04L 63/1416; H04L 63/20
See application file for complete search history.

(56) References Cited

U.S. PATENT DOCUMENTS

| | | | |
|---|---|---|---|
| 12,316,657 B2 * | 5/2025 | Andrews | H04L 63/1425 |
| 2025/0094317 A1 * | 3/2025 | Larkin | G06F 11/3612 |
| 2025/0097130 A1 * | 3/2025 | Sandhaus | G06F 11/3409 |
| 2025/0111066 A1 * | 4/2025 | Oriol | G06F 21/552 |
| 2025/0119311 A1 * | 4/2025 | Sanaullah | H04L 12/1831 |
| 2025/0119462 A1 * | 4/2025 | Thiruchengode Vajravel | H04L 65/403 |
| 2025/0126543 A1 * | 4/2025 | Law | H04W 48/02 |
| 2025/0133121 A1 * | 4/2025 | Crabtree | H04L 63/1433 |
| 2025/0158931 A1 * | 5/2025 | Bashan | H04L 47/2483 |
| 2025/0159007 A1 * | 5/2025 | Kumar | H04L 67/565 |
| 2025/0168197 A1 * | 5/2025 | Finkelshtien | H04L 63/1416 |

* cited by examiner

*Primary Examiner* — Stephen T Gundry
(74) *Attorney, Agent, or Firm* — Fogarty LLP

(57) ABSTRACT

Systems and methods support collection of telemetry by an Information Handling System (IHS). A policy decision point of a zero-trust computing environment controls access to protected resources and receives an indication of attack related to the IHS. A telemetry definition is identified that specifies telemetry being collected by the IHS and it is updated to specify a security delay for telemetry related to the indication of attack. The updated telemetry definition is transmitted to the IHS. Upon identifying telemetry that is ready for transmission, the IHS determines whether the telemetry is subject to a security delay specified in the updated telemetry definition. When the telemetry is subject to a security delay, the telemetry that is ready for transmission is queued and transmitted to one or more destinations specified in the updated telemetry definition upon expiration of the security delay.

20 Claims, 5 Drawing Sheets

SECURITY-LINKED TELEMETRY IN A ZERO-TRUST COMPUTING ENVIRONMENT

FIELD

This disclosure relates generally to Information Handling Systems (IHSs), and, more specifically, to supporting management of networks of IHSs.

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user, or for a specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

The operation of an IHS may be characterized by telemetry data that provides information describing the IHS's operation, in some instances providing measurable information. For instance, IHS telemetry may include environmental sensor readings, such a temperature sensor measurement, or an operational sensor reading, such as the amps being drawn by a hardware component of the IHS. Telemetry generated by an IHS may also provide discrete information, such as the operational status of a hardware component. Telemetry generated by an IHS may also provide a logical rather than physical sensor measurement, such as a telemetry relating the amount of data transferred by a networking component of the IHS. Such telemetry data may collected and used in the management of an IHS.

SUMMARY

In various embodiments, systems and methods support collection of telemetry by an Information Handling System (IHS). System embodiments may include: a policy decision point of a zero-trust computing environment that controls access to a plurality of protected resources, wherein the policy decision point is configured to: receive notification of an indication of attack related to the IHS; identify a telemetry definition specifying telemetry being collected by the IHS; update the telemetry definition to specify a security delay for telemetry related to the indication of attack; transmit the updated telemetry definition to the IHS; and the IHS comprising a plurality of sensors, one or more processors, and a memory coupled to the processors, the memory storing program instructions that, upon execution by the processors, cause the IHS to: identify telemetry that is ready for transmission by the IHS; determine whether the telemetry is subject to a security delay specified in the updated telemetry definition; when the telemetry is subject to a security delay, queue the telemetry that is ready for transmission; and transmit the queued telemetry to one or more destinations specified in the updated telemetry definition upon expiration of the security delay.

In some embodiments, the IHS comprises a remote access controller that identifies the telemetry that is ready for transmission by the IHS. In some embodiments, the remote access controller implements one or more queues for the telemetry queued during a security delay. In some embodiments, the updated telemetry definition specifies a duration for the security delay. In some embodiments, the telemetry definition comprises a telemetry chain of ordered telemetry categories supported by the IHS, and wherein the telemetry categories in the telemetry chain include indicator-of-attack telemetry. In some embodiments, the IHS is further configured to determine whether to queue the telemetry that is ready for transmission based on a position of the telemetry within the telemetry chain relative to the indicator-of-attack telemetry category in the telemetry chain. In some embodiments, the telemetry is queued when its position in the telemetry chain is nearer to the end of the telemetry chain than the indicator-of-attack telemetry category. In some embodiments, the telemetry definition further specifies an adjustment to a frequency of telemetry collection by the IHS. In some embodiments, the telemetry definition further specifies an adjustment to telemetry collected by hardware component that is associated with the indication of attack. In some embodiments, the telemetry definition further specifies an adjustment to telemetry collected related to a user that is associated with the indication of attack.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
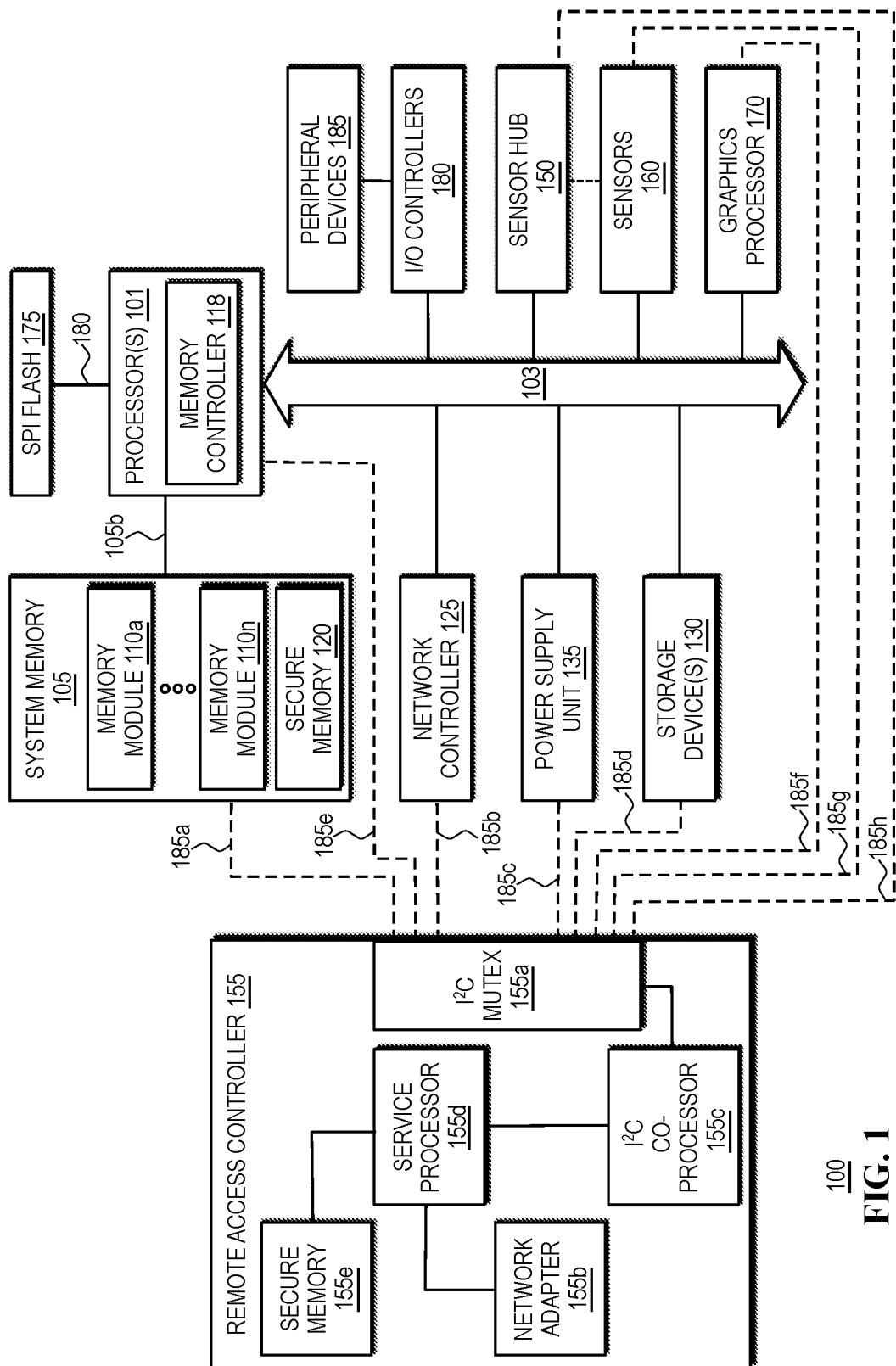
FIG. 1 is a diagram illustrating certain components of an personal IHS operable, according to some embodiments, to support security-linked telemetry when the personal IHS is configured to operate in a zero-trust computing environment.
Figure 2:
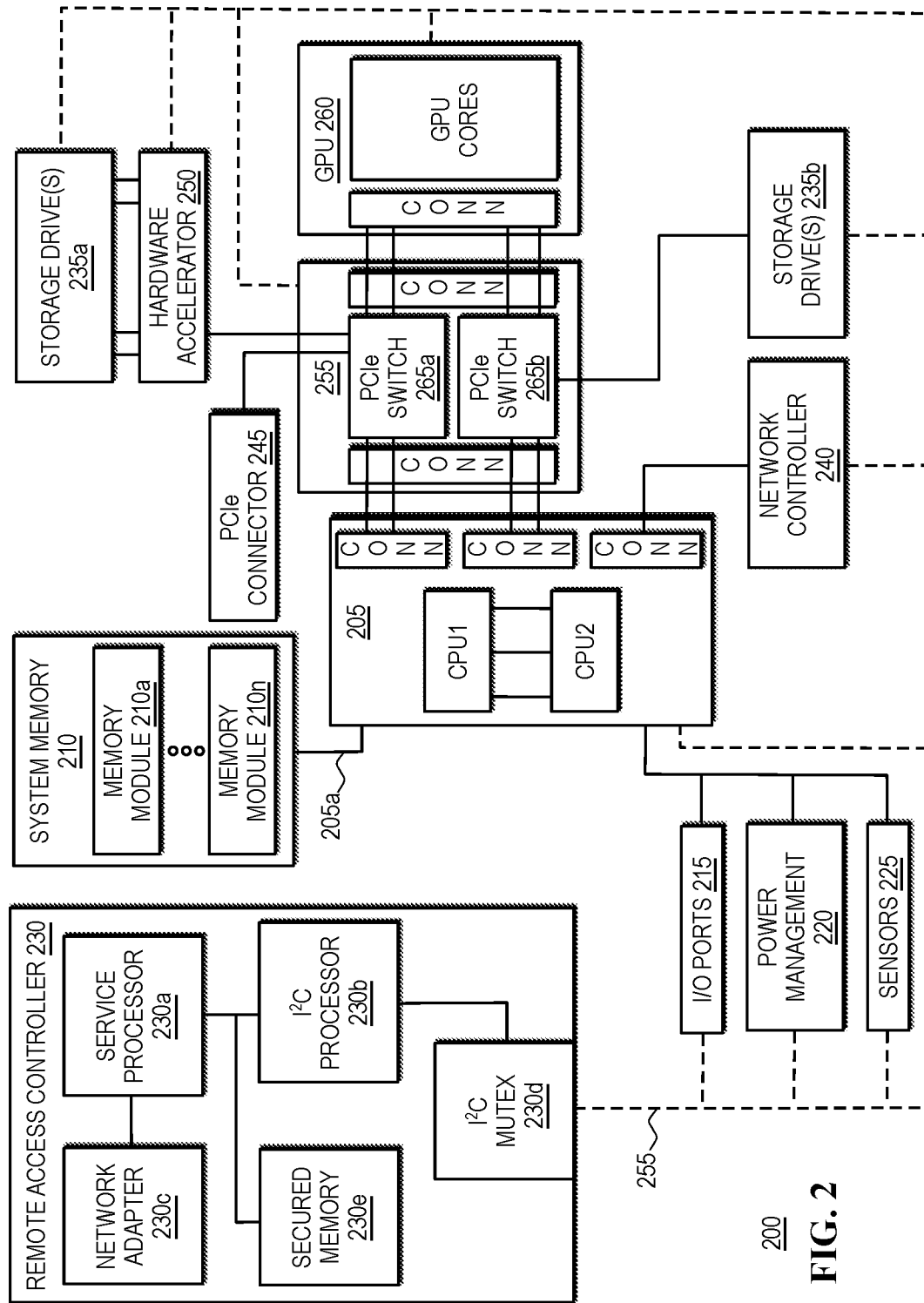
FIG. 2 is a diagram illustrating certain components of an server IHS operable, according to some embodiments, to support security-linked telemetry when the server IHS is configured to implement and/or operate within a zero-trust computing environment.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. Examples of IHSs are described in more detail below. FIG. 1 shows various internal components of a personal IHS, such as a laptop computer, desktop computer or a tablet, that may be configured to implement the described embodiments. FIG. 2 shows various internal components of a server IHS, such as a rack-mounted server that is located in a data center, that may be configured to implement the described embodiments. It should be appreciated that other embodiments may utilize various other types of IHSs.

FIG. 1 is a diagram depicting certain components of an illustrative personal IHS 100 that is operable according to various embodiments for the security-linked transmission of telemetry when the personal IHS 100 is configured to operate in a zero-trust computing environment. As described in additional detail below, a personal IHS 100 may be configured as a participant in a zero-trust computing environment that controls access to protected resources. Within a zero-trust computing environment, all users must be authenticated, authorized, and continuously validated in order access a protected resource. Through operation of a personal IHS 100, such as a laptop computer, a user may request access to a protected resource of the zero-trust computing environment. As described in additional detail below, in embodiments, a personal IHS 100 may be configured to support adaptive telemetry for use within the zero-trust computing environment, and in particular for use in securing access to zero-trust resources. Through support for adaptive telemetry according to embodiments, a personal IHS 100 provides responsive telemetry that promotes the ability to provide continuously validated access to protected resources.

In some scenarios, certain telemetry may serve as notifications of various indicators of attack within the zero-trust computing environment, whether the attack targets a specific IHS 100, a protected resource of the zero-trust computing environment, and/or the zero-trust computing environment generally. A variety of telemetry may be classified as security telemetry that are indicators of attack. As described in additional detail below, embodiments support remediations to indicators of attack within the telemetry, where the remediations seek to confirm that the telemetry system itself is not a source of the indications of attack.

In a zero-trust computing environment that is continuously validating access to protected resources and that utilizes collected telemetry in making these access determinations, the inability to configure the telemetry that is being collected and transmitted defeats the ability to actually provide continuous validation of access to protected resources. Embodiments support the continuous validation of access to protected resources that is accurately based on current operating conditions, rather than using stale telemetry, or telemetry that is inadequate due to inability to re-configure the telemetry that is being generated and transmitted.

In some embodiments, personal IHS 100 may be an element of a larger enterprise system that may include any number of similarly configured IHSs in network communications with each other. For instance, personal IHS 100 may be a laptop computer that is issued to an employee of an organization and that is centrally managed by the employer. In another illustrative example, personal IHS 100 may be a laptop computer, tablet or hybrid computer that is issued to a student by an educational institution. In some instances, personal IHS 100 may be a portable IHS or a desktop IHS that is available for use within an organization, such as within a hospital or educational institution. In some instances, personal IHS 100 may be a privately owned portable or desktop IHS.

As shown in FIG. 1, personal IHS 100 includes one or more processors 101, such as a Central Processing Unit (CPU), that execute code retrieved from a system memory 105. Although personal IHS 100 is illustrated with a single processor 101, other embodiments may include two or more processors, that may each be configured identically, or that may be configured to support specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS personal 100 via a high-speed memory interface 105b.

System memory 105 that is coupled to processor(s) 101 via memory bus 105b provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory. In certain embodiments, system memory 105 includes secure storage 120 that may be a portion of the system memory designated for storage of information, such as access policies, component signatures, encryption keys, and other cryptographic information, for use in securely adapting the collection and/or transmission of telemetry by IHS 100.

In certain embodiments, the system memory 105 may be comprised of multiple removable memory modules 110a-n. Each of the removable memory modules 110a-n may correspond to a printed circuit board memory socket that receives a removable memory module such as a DIMM (Dual In-line Memory Module), that can be coupled to the socket and then decoupled from the socket as needed, such as to upgrade memory capabilities or to replace faulty memory modules. Other embodiments of IHS system memory 105 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

Personal IHS 100 utilizes chipset 103 that may include one or more integrated circuits that are coupled to processor(s) 101. In the embodiment of FIG. 1, chipset 103 is depicted as a set of busses that couple processor 101 to various hardware components installed in the same motherboard. In some embodiments, all or portions of chipset 103 may be implemented directly within the integrated circuitry of processor(s) 101. Chipset 103 thus provides processor(s) 101 with access to a variety of hardware resources. In personal IHS 100, chipset 103 is illustrated as a single coupling with processor 101. However, other implementations may utilize any number of connections to provide the illustrated communication pathways supported by chipset 103.

In certain embodiments, personal IHS 100 may include a SPI (Serial Peripheral Interface) flash device 175 that stores certain data and instructions utilized by processor 101. The SPI flash 175 may be a non-volatile memory device capable of being electrically erased and reprogrammed. SPI flash 175 may be coupled to processor 101 over an SPI bus 180 that supports transfers of blocks of data to and from SPI flash 175. In some embodiments, SPI flash 175 may be divided into various regions, with each region storing different types of instructions and/or data. In certain embodiments, some of the regions of SPI flash 175 may be provisioned during trusted manufacture of IHS 100, such as with boot code, cryptographic keys, firmware reference signatures, hardware setting reference signatures, and tokens that are used to implement security protocols utilized by IHS 100, including secure protocols used in adapting the collection and/or transmission of telemetry by IHS 100.

Personal IHS 100 may operate through operations of a BIOS (Basic Input/Output System) that may include instructions stored in a non-volatile memory that may be accessible by processor 101. The BIOS provides an abstraction layer that allows an operating system of the personal IHS 100 to interface with the hardware components of the IHS. Accordingly, BIOS provides an abstraction layer to the firmware utilized by various hardware components of personal IHS 100. In some embodiments, BIOS may be implemented using a dedicated microcontroller coupled to the motherboard of personal IHS 100. In some embodiments, some or all of BIOS may be implemented as operations of an embedded controller, such remote access controller 155. Upon powering or restarting IHS personal 100, processor(s) 101 may utilize BIOS to initialize and test various hardware components of the IHS personal 100. Upon successful validation of these hardware components, in some embodiments, BIOS may also initiate loading of an operating system for use by the personal IHS 100. In some embodiments, BIOS telemetry may be designated within a telemetry chain of personal IHS 100 as critical telemetry.

As illustrated, processor(s) 101 may also be coupled to a network controller 125, such as provided by a Network Interface Controller (NIC) that is coupled to the personal IHS 100 and allows the IHS to communicate with other systems, such as other IHSs, via an external network, such as the Internet or a LAN. The network controller 125 of personal IHS 100 may support wired and/or wireless network connections via a variety of network technologies, such as wireless cellular or mobile networks (CDMA, TDMA, LTE etc.), WIFI and BLUETOOTH. As illustrated, network controller 125 may support a sideband management connection 185*b* with a remote access controller 155 of IHS 100, where this sideband manage connection 185*b* may be utilized in the adaptation of telemetry collection by network controller 125. In some embodiments, network controller 125 may be instrumented with a microcontroller or other logic unit that supports the sideband management connection 185*b* with the remote access controller 155 of IHS 100. In some embodiments, network controller 125 telemetry may be designated within a telemetry chain of personal IHS 100 as operational telemetry.

Chipset 103 may also support communications with one or more display device(s) via graphics processor 170. In certain embodiments, graphics processor 170 may be comprised within one or more video or graphics cards or an embedded controller installed as components of the personal IHS 100. Graphics processor 170 may generate display information and provide the generated information to one or more display device(s) coupled to personal IHS 100, where display device(s) may include integrated display devices and/or external display devices coupled to IHS, where the display devices may be peripheral devices accessed via I/O controllers of the IHS. In certain embodiments, some or all of the functions supported by graphics processor 170 may be integrated within processor 101. Each display device may be capable of touch input such as via a touch controller that may be a component of a display device, graphics processor 170, or a separate component of personal IHS 100 accessed via bus 103. As illustrated, graphics processor 170 may support a sideband management connection 185*f* with remote access controller 155, where this sideband manage connection 185*f* may be utilized in the adaptation of telemetry collection by graphics processor 170. In some embodiments, graphics processor 170 may be instrumented with a microcontroller or other logic unit that supports the sideband management connection 185*f* with the remote access controller 155. In some embodiments, graphics processor 170 telemetry may be designated within a telemetry chain of personal IHS 100 as auxiliary telemetry.

As illustrated, personal IHS 100 may also include a power supply unit 160 that provides the hardware components of IHS 100 with DC power. Power inputs received via a power port or via USB ports may be routed to the power supply unit 160 of personal IHS 100. The power inputs received by power supply unit 160 may be used in powering the operations of personal IHS 100 and in recharging internal batteries of personal IHS 100. In some embodiments, power supply unit 160 may support power outputs that are drawn from the internal batteries of personal IHS 100 and that are provided to external devices coupled to personal IHS 100, such as USB devices coupled to USB ports of personal IHS 100. In some embodiments, power supply unit 160 may provide power to components of personal IHS 100 using multiple independent power planes. For instance, as described below, remote access controller 155 may be powered by power supply unit 160 from a separate power plane from processor 101. As illustrated, power supply unit 160 may support a sideband management connection 185*c* with remote access controller 155, where this sideband manage connection 185*c* may be utilized in the adaptation of telemetry collection by power supply unit 160. In some embodiments, power supply unit 160 may be instrumented with a microcontroller or other logic unit that supports the sideband management connection 185*c* with the remote access controller 155. In some embodiments, power supply unit 160 telemetry may be designated within a telemetry chain of personal IHS 100 as operational telemetry, or in some instances as critical telemetry.

In embodiments, personal IHS 100 may include one or more storage devices 130. In various embodiments, a storage device 130 may be integral to the personal IHS 100, or may instead be external to the IHS. In certain embodiments, storage device 130 may be accessed via a storage controller that may be an integrated component of the storage device. Storage device 130 may be implemented using any memory technology allowing personal IHS 100 to store and retrieve data. For instance, storage device 130 may be a magnetic hard disk storage drive or a solid-state storage drive. As illustrated, a storage device 130 may support a sideband management connection 185*d* with remote access controller 155, where this sideband manage connection 185*d* may be utilized in the adaptation of telemetry collection by the storage device 130. In some embodiments, a storage device 130 may be instrumented with a microcontroller or other logic unit that supports the sideband management connection 185*d* with the remote access controller 155. In some embodiments, storage device 130 telemetry may be designated within a telemetry chain of personal IHS 100 as operational telemetry.

In certain embodiments, chipset 103 may implement or otherwise utilize one or more I/O controllers 180 to access various peripheral hardware components 185 that may be removably coupled to the IHS various wired and/or wireless technologies. For instance, I/O controllers 180 may provide access to peripheral user I/O devices 180 such as a keyboard, mouse, touchpad, touchscreen, display monitors, stylus and other input devices that may interface with an I/O controller through wired or wireless connections in providing user input capabilities. Peripheral devices of the personal IHS 100 may also include various different sensors 160 that may be accessed in a variety of manners. In some embodiments, peripheral hardware component 185 telemetry may be designated within a telemetry chain of personal IHS 100 as auxiliary telemetry.

In some embodiments, personal IHS 100 may include a sensor hub 150 that utilizes data collected by sensors 160 in identifying various conditions related to the operation of the IHS 100. For instance, the sensor hub 150 may utilize inertial movement sensors 160, that may include accelerometer, gyroscope, and magnetometer sensors, and are capable of determining the orientation and movement of a personal IHS 100 (e.g., personal IHS 100 is laptop or tablet that is motionless on a relatively flat surface, personal IHS 100 is being moved irregularly and is likely in transport, the hinge of a personal IHS 100 hybrid laptop is oriented in a vertical direction thus indicating the hybrid laptop is being used in a book mode). In certain embodiments, the sensor hub 150 may determine a location and/or movement of IHS 100 based on triangulation of network signal information, that may be provided by network controller 125, and/or based on network information provided by the operating system. In some embodiments, the sensor hub 150 may support optical, infrared, sonar and/or other time-of-flight sensors 160, that may provide support for xR (virtual, augmented, and/or mixed reality) sessions hosted by the IHS 100 and may be used by the sensor hub 150 in providing an indication of a user's presence near IHS 100, such as whether a user is present, absent, inattentive and/or facing an integrated display of the IHS.

In scenarios where sensor 160 inputs indicate a user is in physical proximity to the IHS 100, the sensor hub 150 may further determine a distance of the user from the IHS, where such proximity determinations may be repeated at a configurable interval, or upon request. In some embodiments, sensor hub 150 may synthesize such inputs collected from sensors 160 in generating various forms of telemetry that may then be transmitted for use within the zero-trust computing environment. In some embodiments, the telemetry that is collected and transmitted by the sensor hub 150 may be specified in a telemetry definition, where this telemetry definition may be updated by a policy decision point of a zero-trust computing environment and received by an adaptive telemetry orchestrator of the personal IHS 100 that interprets the telemetry definition and configures the sensor hub 150 to collect and transmit telemetry according to the telemetry definition.

In various embodiments, sensor hub 150 may generate a variety of telemetry data from collected sensor data, where the telemetry data may be used in characterizing the risk posture of the personal IHS 100, subsystems of which personal IHS 100 is a member and/or of the zero-trust computing environment. For instance, the user presence telemetry may be used in characterizing risks posed by detected onlookers in proximity to the personal IHS 100 with respect to content that is being display by the IHS, where such onlookers are individuals other than the authorized user of the personal IHS 100. In another illustrative scenario, the sensor hub 150 may collect and collate multiple streams of sensor 160 data in order to generate telemetry data that identifies the location of the personal IHS 100, where the location may be a geographic location, such as a GPS location, or a physical location relative to a geographic boundary or location, such as specifying the personal IHS 100 is located in a particular country and/or facility. In some zero-trust computing environments, access to protected data may require that IHS 100 be located within a geographic area, such as a corporate campus, or additional security measures must be initiated, such as the use of a VPN. In another illustrative scenario, the sensor hub 150 may collect and collate various sources of power information, such as battery charge levels or other battery condition information. In embodiments, sensor hub 150 may collect a wide variety of sensor 160 data that is used to generate telemetry, where the telemetry that is generated for use within the zero-trust computing environment may be specified in a received telemetry definition. In some embodiments, sensor hub 150 telemetry may be designated within a telemetry chain of personal IHS 100 as operational telemetry. In other embodiments, different sensor hub 150 telemetry may be designated differently within the telemetry chain, such as designating user-presence and IHS location telemetry as auxiliary telemetry, and designating power telemetry as critical telemetry. Though such designations within the telemetry chain, embodiments may select different portions of the collected telemetry to queue during a security delay.

With respect to the generation of user-presence telemetry data, the calculated distances between the user and the IHS generated based on time-of-flight sensor data may be used by the sensor 150 in generating user-presence telemetry that provides an indication of the use's general location with respect to the IHS. User presence data collected from sensors 160 may be used by sensor hub 150 in to classify the user as being in the IHS's near-field (user's position<threshold distance A), mid-field (threshold distance A<user's position<threshold distance B, where B>A), or far-field (user's position>threshold distance C, where C>B). In some embodiments, such user-presence telemetry may be utilized within the zero-trust computing environment, in order to adjust various privacy settings utilized by personal IHS 100 and/or by other IHSs in physical proximity to personal IHS 100. For instance, access to protected data may require that the user of the IHS 100 must be detected in close proximity to the IHS in order to minimize the risk of onlookers to displayed content. In some embodiments, user-presence telemetry may be used by a policy decision point in controlling access to protected resources of the zero-trust computing environment. In embodiments, the collection of such user-presence telemetry that is used in making such determinations may be adapted, such as by increasing the collection of user-presence telemetry in response to detecting the presence of multiple individuals in close proximity to the IHS.

In embodiments where personal IHS 100 may support multiple physical configurations, such as a convertible laptop, N-in-1 device, or other hybrid laptops, the sensor hub 150 may utilize one or more mode sensors 160 in determining the physical posture in which personal IHS 100 is physically configured. For instance, in laptop embodiments, sensor hub 150 may utilize a lid position sensor 160 to determine the relative angle between the two panels of the laptop in order to determine the mode in which IHS 100 is physically configured. Starting from a closed position, a first range of hinge angles may indicate a laptop posture, a second range of hinge angles may indicate a landscape posture, and a third range of hinge angles may indicate a tablet posture of the IHS 100. The sensor hub may additionally utilize orientation and movement information collected from inertial movement sensors 160 to further determine the posture in which IHS 100 is physically configured. For instance, if the sensor hub determines that IHS 100 is configured with a hinge angle of a laptop configuration, but IHS 100 is oriented on its side with the hinge in a vertical orientation, the IHS may be determined to be in a book mode. In another example where the IHS 100 is determined to be tilted such that the hinge is oriented between horizontal and vertical, the user's face is detected to be facing the integrated display, and IHS 100 is experiencing irregular, slight movements, the sensor hub 150 may determine that IHS 100 is being used in a book posture while the user is in transit. In another example, the sensor hub 150 may determine that IHS 100 is opened to a 180-degree hinge angle and lies on a flat surface, thus indicating that IHS 100 it is being used in a landscape posture. The sensor hub 150 may similarly determine that IHS 100 is in a tent configuration in response to detecting a hinge angle within a defined range, such as between 300 and 345 degrees, and also detecting an orientation of IHS 100 where the hinge is aligned horizontally and is higher than both of the display panels of IHS 100.

As with the user-presence determinations made by sensor hub 150, physical posture determinations by sensor hub 150 may also be available in the form of telemetry used within a zero-trust computing system. For instance, a security risk associated with IHS 100 may be affected by the physical posture in which the IHS is configured, and thus of the possibility of onlookers viewing content displayed by the IHS. In this manner, a variety of additional sensors 160 may be utilized in describing operating conditions of an IHS 100, such as accelerometers, gyroscopes, hall effect sensors, temperature sensors, voltage sensors, current sensors, IR sensors, photosensors, magnetic sensors, microphones, ultrasonic sensors, etc. Like the user-presence and physical posture information, any data collected from sensors 160 by sensor hub 150 may be utilized in generating telemetry for use within the zero-trust computing environment. In some embodiments, changes in physical posture may indicate changes in the security posture of the IHS 100, such that the telemetry collected by the IHS may be adapted, such as to account for the greater possibility of onlookers in certain postures, especially when user-presence telemetry indicates the presence of multiple individuals in close proximity to the IHS.

As illustrated, personal IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of personal IHS 100. Remote access controller 155 may be installed on the motherboard of personal IHS 100 or may be coupled to the IHS via an expansion slot provided by the motherboard.

In some embodiments, remote access controller 155 may operate from a different power plane from processors 101, storage devices 130, graphics processor 170, network controller 125 and various other components of personal IHS 100, thus allowing the remote access controller 155 to operate, and management tasks to proceed, while the processing cores of IHS are powered off. In some embodiments, various BIOS functions, including launching the operating system of the personal IHS 100, may be implemented by the remote access controller 155. In some embodiments, the remote access controller 155 may perform various functions to verify the integrity of the personal IHS 100 and its hardware components prior to initialization of the IHS (i.e., in a bare-metal state).

In some embodiments, remote access controller 155 may support monitoring and administration of various managed devices 101, 105, 125, 130, 135, 150, 160, 170 of personal IHS 100 via a sideband bus interface. For instance, messages utilized in device management may be transmitted using I2C sideband bus connections 185*a-f* that may be individually established with each of the respective managed devices 101, 105, 125, 130, 135, 150, 160, 170 through the operation of an I2C multiplexer 155*a* of the remote access controller. As illustrated, some of the managed devices 125, 130, 135, 150, 160, 170 are coupled to the IHS processor(s) 101 via one or more in-band buses that are supported by the chipset 103, where these in-band busses are separate from the I2C sideband bus connections 185*a-h* used for device management. Accordingly, managed devices 101, 105, 125, 130, 135, 150, 160, 170 communicate with the operating system of personal IHS 100 via in-band buses supported by chipset 103, while the sideband buses 185*a-h* support exclusive use of these signaling pathways by remote access controller 155.

In certain embodiments, a service processor 155*d* of remote access controller 155 may rely on an I2C co-processor 155*c* to implement sideband I2C communications between the remote access controller 155 and managed components 101, 105, 125, 130, 135, 150, 160, 170 of the IHS. The I2C co-processor 155*c* may be a specialized co-processor or micro-controller that is configured to interface via a sideband I2C bus interface with the managed hardware components 101, 105, 125, 130, 135, 150, 160, 170 of IHS. In some embodiments, the I2C co-processor 155*c* may be an integrated component of the service processor 155*d*, such as a peripheral system-on-chip feature that may be provided by the service processor 155*d*. Each I2C bus 185*a-h* is illustrated as single line in FIG. 1. However, each I2C bus 185*a-h* may be comprised of a clock line and data line that couple the remote access controller 155 to I2C endpoints 101, 105, 125, 130, 135, 150, 160, 170 on each of the managed components.

As illustrated, the I2C co-processor 155*c* may interface with the individual managed devices 101, 105, 125, 130, 135, 150, 160, 170 via individual sideband I2C buses 185*a-h* selected through the operation of an I2C multiplexer 155*a*. Via switching operations by the I2C multiplexer 155*a*, a sideband bus connection 185*a-h* may be established through a direct coupling between the I2C co-processor 155*c* and each of the individual managed devices 101, 105, 125, 130, 135, 150, 160, 170. In providing sideband management capabilities, the I2C co-processor 155*c* may interoperate with corresponding endpoint I2C controllers that implement the I2C communications of the respective managed devices 101, 105, 125, 130, 135, 150, 160, 170. The endpoint I2C controllers may be implemented as dedicated microcontrollers for communicating sideband I2C messages with the remote access controller 155, or endpoint I2C controllers may be integrated SoC functions of a processor of the respective managed device endpoints 101, 105, 125, 130, 135, 150, 160, 170.

In some embodiments, remote access controller 155 may support the operation of a secure execution environment in which management applications may operate. As described, the remote access controller 155 may be implemented using a service processor 155d that supports management operations. In some embodiments, the service processor 155d may load instructions from a secure memory 155e and execute the instructions to instantiate a secure execution environment. In some embodiments, the secure execution environment may be instantiated based on trusted instructions that may be validated based on factory-provisioned reference signatures. For instance, a digital signature corresponding to the factory-provisioned firmware for operation by service processor 155d is stored to secure memory 155e during factory-provisioning of IHS 100. This firmware may include instructions by which the secure execution environment operates.

Within this secure execution environment of the remote access controller 155, various management processes may operate. As described above, management of an personal IHS 100 may include the collection of telemetry that is generated by the software and hardware of the IHS. As described in additional detail below, the management processes operating within the secure execution environment of the remote access controller 155 may include an adaptive telemetry orchestrator that supports the adaptive collection and transmission of telemetry by managed hardware components of the IHS 100.

In some embodiments, the adaptive telemetry orchestrator of the remote access controller 155 receives instructions for the adaptive collection and transmission of telemetry in the form of a telemetry definition. As described in additional detail below, the adaptive telemetry orchestrator may be configured to interoperate with a policy decision point of a zero-trust computing environment in the implementation of adaptive telemetry by personal IHS 100. In some embodiments, a policy decision point of a zero-trust computing environment provides the adaptive telemetry orchestrator that is implemented by remote access controller 155 with a telemetry definition that specifies the telemetry that is requested by the policy decision point, where the telemetry transmitted to the policy decision point may be used in securing access that is provided to resources that are protected by the zero-trust computing environment. As described in additional detail below, in some embodiments, a telemetry definition may specify adjustments to the telemetry to be collected, such as adjusting the telemetry that is collected with respect to a specific hardware component, user 305, resource 340 or IHS 100, or adjusting the frequency at which telemetry is collected and/or transmitted, or adjusting sensor fidelity, etc.

In addition, a telemetry definition may specify remediation procedures to be initiated by the telemetry orchestrator with respect to one or more indicators of attack that have been detected within the zero-trust computing environment. In particular, the remediation procedures in the telemetry definition may specify a security delay to be implemented by the telemetry orchestrator, where the security delay provides opportunity for the telemetry system to be ruled out as a contributor to the indicators of attack that have been detected. In some embodiments, the remote access controller 155 may support operations of the telemetry orchestrator in adapting telemetry and collection during a security delay.

As described, a remote access controller 155 may support sideband communication capabilities with managed hardware components of an IHS 100 and with external management tools and resources. These sideband communication pathways and various inband signaling pathways may be available to the adaptive telemetry orchestrator for use in configuring the telemetry that is collected and in reported the collected telemetry. As described in additional detail below, in some embodiments, for collected telemetry that is ready for transmission, the adaptive telemetry orchestrator may determine whether to delay transmission of that telemetry due to a security delay, where the telemetry that is selected for delayed transmission may be based on the position of that telemetry in the telemetry chain for the IHS.

In some embodiments, the adaptive telemetry orchestrator that is operated by the remote access controller 155 may parse the requested adjustments to the available telemetry streams from a received telemetry definition. In some embodiments, the telemetry definition may also specify a telemetry chain for use in the selection of telemetry streams that are to be subject to security delays, and for selection of the signaling pathways for transmission of each stream of telemetry that is being collected by the personal IHS 100. In some embodiments, the telemetry chain specified in the telemetry definition may provide an ordered classification of telemetry. For instance, a telemetry chain may specify core telemetry at one end of the chain, followed by security telemetry, followed by operational telemetry, followed by auxiliary telemetry. In some scenarios, the telemetry chain may include a classification for error telemetry. In some scenarios, the telemetry chain may include a classification for bulk telemetry. Other telemetry chains may include some or all of these classifications in different orders. Other telemetry chains may include additional classifications.

As described in additional detail below, the adjustments specified in a telemetry definition may alter the different telemetry steams that are transmitted after a security delay by the personal IHS 100. In some embodiments, all telemetry designated as indicators-of-attack in the telemetry chain may be queued during a security delay by operations of the adaptive telemetry orchestrator. In some embodiments, all telemetry that is designated according to category that is lower in the telemetry chain that then indicator-of-attack telemetry may be queued during a security delay. For instance, in a scenario where telemetry categorizations such as bulk, auxiliary and operational telemetry follow the indicator-of-attack telemetry in the telemetry chain, those telemetry categories will also be queued during a security delay, thus delaying transmission of these categories of telemetry while allowing more critical telemetry categories on the other end of the telemetry chain to be transmitted without security delays. If the telemetry chain is re-ordered such that the indicator-of-attack telemetry is in a different position in the telemetry chain, a different portion of the telemetry will be queued during a security delay.

The collection of telemetry for use in the management of a computing system risks exacerbating resource contention in scenarios where computing, memory, network, storage and/or communication resources are constrained. Moreover, in scenarios where resources are constrained, the ability to modify the ongoing collection of telemetry may be severely compromised. When the ability to modify telemetry collection is precluded, the telemetry that is collected may be stale or inadequate, such that access control policies of the zero-trust computing environment are then evaluated using this stale and/or inadequate telemetry. Accordingly, embodiments support out-of-band adaptations to the telemetry that is collected within a zero-trust computing environment, thus preserving the ability of that zero-trust computing environment to support continual validation of sessions that provide access to protected resources.

Remote access controller 155 may implement out-of-band communications pathways that are isolated from the operating system of personal IHS 100, where such out-of-band communication capabilities of remote access controller 155 may include a network adapter 155*b* that is distinct from main network controller 125 utilized by the operating system of personal IHS 100 and that may be used in support of remote management of the IHS. In some embodiments, telemetry definitions may be transmitted to an adaptive telemetry orchestrator operating on remote access controller 155 through such out-of-band communications channels supported by network adapter 155*b* in order to ensure adaptations to telemetry collection are made during periods of resource contention, when the telemetry adaptations may be needed most In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

FIG. 2 is a diagram illustrating certain components of a server IHS 200 operable, according to some embodiments, to support security-linked transmission of telemetry when the server IHS 200 is configured to implement and/or operate within a zero-trust computing environment. In the illustrative embodiment of FIG. 2, server IHS 200 may be a rack-mounted server, such as an 1RU server IHS that is installed within a 2RU chassis, where the server IHS may be configured to share infrastructure resources provided within the chassis. In embodiments, some or all of the various resources of server IHS 200 may be used to implement one or more zero-trust computing environments, as described in additional detail below. In addition, server IHS 200 embodiments may be configured to support adaptive collection of telemetry by personal IHSs 100 that are members of a zero-trust computing environment that is implemented in full or in part by the server IHS 200. In some embodiments, server IHS 200 may itself be a source of telemetry data that is used in the management of the zero-trust computing environment in the same or similar manner to the personal IHS 100 that are requestors of resources that are protected by the zero-trust computing environment. In some embodiments, the telemetry that is collected and transmitted by the server IHS 200 may be specified in a telemetry definition that is generated by a policy decision point of a zero-trust computing environment, in the exact same manner as for a personal IHS 100. In particular, the telemetry collected by server IHS 200 may be classified according to a telemetry chain that may be consulted when selecting telemetry to queued during a security delay.

A server IHS 200 may include one or more system processor(s) 205, that may be referred to as CPUs (Central Processing Units). In some embodiments, CPUs 205 may each include a plurality of high-power processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205*a*. The system memory 210 is coupled to CPUs 205 via one or more memory buses 205*a* that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain server IHS 200 embodiments, the system memory 210 may be comprised of multiple removable memory modules. The system memory 210 of the illustrated embodiment includes removable memory modules 210*a-n*. Each of the removable memory modules 210*a-n* may correspond to a printed circuit board memory socket that receives a removable memory module 210*a-n*, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

Server IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. Server IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of a chassis in which server IHS 200 may be installed. In addition, CPUs 205 may collect information from one or more sensors 225 via a management bus. In some embodiments, CPUs 205 telemetry may be designated within a telemetry chain of server IHS 200 as critical telemetry.

In certain embodiments, server IHS 200 may operate using a BIOS (Basic Input/Output System) that may be stored in a non-volatile memory accessible by the CPUs 205. The BIOS may provide an abstraction layer by which the operating system of the server IHS 200 interfaces with hardware components of the IHS. Upon powering or restarting server IHS 200, CPUs 205 may utilize BIOS instructions to initialize and test hardware components coupled to the IHS, including both components permanently installed as components of the motherboard of server IHS 200 and removable components installed within various expansion slots. The BIOS instructions may also load an operating system for execution by CPUs 205. In certain embodiments, server IHS 200 may utilize Unified Extensible Firmware Interface (UEFI) in addition to or instead of a BIOS. In certain embodiments, the functions provided by a BIOS may be implemented, in full or in part, by the remote access controller 230. In some embodiments, BIOS telemetry may be designated within a telemetry chain of server IHS 200 as core telemetry.

In some embodiments, server IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of server IHS 200. These calculated hash values may then be compared against reference hash values that were previously stored in a secure non-volatile memory of the IHS, such as during factory provisioning of server IHS 200. In this manner, operations of a TPM may be used to establish a root of trust that includes core components of server IHS 200 that are validated as operating using instructions that originate from a trusted source, and in some instances originating from factory-provisioning of the server IHS 200. In some embodiments, TPM telemetry may be designated within a telemetry chain of server IHS 200 as critical telemetry.

As illustrated, CPUs 205 may be coupled to a network controller 240, such as provided by a Network Interface Controller (NIC) card that provides server IHS 200 with communications via one or more external networks, such as the Internet, a LAN, or a WAN. In some embodiments, network controller 240 may be a replaceable expansion card or other component that is coupled to a connector (e.g., PCIe connector of a motherboard, backplane, midplane, etc.) of server IHS 200. In some embodiments, network controller 240 may support high-bandwidth network operations by the IHS 200 through a PCIe interface that is supported by the chipset of CPUs 205. As with the network controller 125 of personal IHS 100, the network controller 240 of server IHS 200 may be instrumented in various manners in order to support adaptive collection of telemetry. Network controller 240 may support a sideband management connection with a remote access controller 230 of server IHS 200, where this sideband manage connection may be utilized in the adaptation of telemetry collection by network controller 240. In some embodiments, network controller 240 telemetry may be designated within a telemetry chain of server IHS 200 as operational telemetry.

As indicated in FIG. 2, in some embodiments, CPUs 205 may be coupled to a PCIe card 255 that includes two PCIe switches 265*a-b* that operate as I/O controllers for PCIe communications, such as TLPs (Transaction Layer Packets), that are transmitted between the CPUs 205 and PCIe devices and systems coupled to server IHS 200. Whereas the illustrated embodiment of FIG. 2 includes two CPUs 205 and two PCIe switches 265*a-b*, different embodiments may operate using different numbers of CPUs and PCIe switches. In addition to serving as I/O controllers that route PCIe traffic, PCIe switches 265*a-b* include switching logic that can be used to expand the number of PCIe connections that are supported by CPUs 205. PCIe switches 265*a-b* may multiply the number of PCIe lanes available to CPUs 205, thus allowing more PCIe devices to be connected to CPUs 205, and for the available PCIe bandwidth to be allocated with greater granularity. As with network controller 240, each respective PCIe switch 265*a-b* may be instrumented in various manners in order to support adaptive collection of telemetry. Each separate PCIe switch may support a sideband management connection with a remote access controller 230 of server IHS 200, where this sideband manage connection may be utilized in the adaptation of telemetry collection by each respective PCIe switch 265*a-b*. In some embodiments, PCIe switch 265*a-b* telemetry may be designated within a telemetry chain of server IHS 200 as operational telemetry.

As indicated in FIG. 2, IHS 200 may support storage drives 235*a-b*, where such drives may be organized in various topologies. In the illustrated embodiment, storage drives 235*a* are accessed via a hardware accelerator 250, while storage drives 235*b* are accessed directly via PCIe switch 265*b*. In some embodiments, the storage drives 235*a-b* of server IHS 200 may include a combination of both SSD and magnetic disk storage drives. In other embodiments, all of the storage drives 235*a-b* of server IHS 200 may be identical, or nearly identical. In some scenarios, the storage drives 235*a-b* that are accessible via server IHS 200 may be pooled and used to provide redundant storage, such as provided by a vSAN application supported by the chassis in which the server IHS 200 is installed. As with network controller 240 and PCIe switched 265*a-b*, each respective storage drive 235*a-b* may be instrumented in various manners in order to support adaptive collection of telemetry. Each separate storage drive 235*a-b* may support a sideband management connection with a remote access controller 230 of server IHS 200, where this sideband manage connection may be utilized in the adaptation of telemetry collection by each respective storage drive 235*a-b*. In some embodiments, storage drive 235*a-b* telemetry may be designated within a telemetry chain of server IHS 200 as auxiliary telemetry.

As illustrated, PCIe switch 265*a* is coupled via a PCIe link to a hardware accelerator 250, such as a DPU, Smart-NIC, GPU and/or FPGA, that may be a connected to the IHS via a removeable card or baseboard that couples to a PCIe connector of the server IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the server IHS 200. In some embodiments, a hardware accelerator 250 may be instrumented in in various manners in order to support adaptive collection of telemetry and may support a sideband management connection with a remote access controller 230 of server IHS 200, where this sideband manage connection may be utilized in the adaptation of telemetry collection by hardware accelerator 250. In some embodiments, hardware accelerator 250 telemetry may be designated within a telemetry chain of server IHS 200 as operational telemetry.

As illustrated in FIG. 2, PCIe switches 265*a-b* may also support PCIe couplings with one or more GPUs (Graphics Processing Units) 260. Embodiments may include one or more GPU cards, where each GPU card is coupled to one or more of the PCIe switches 265*a-b*, and where each GPU card may include one or more GPUs 260. In some embodiments, PCIe switches 265*a-b* may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some workloads, GPUs may be utilized as programmable computing resources for offloading other functions from CPUs 205, in the same manner as hardware accelerator 250. As with hardware accelerator 250, GPUs 260 may be instrumented in various manners in order to support adaptive collection of telemetry and may support a sideband management connection with a remote access controller 230 of server IHS 200, where this sideband manage connection may be utilized in the adaptation of telemetry collection by GPUs 260. In some embodiments, GPU 260 telemetry may be designated within a telemetry chain of server IHS 200 as operational telemetry.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of server IHS 200 may allow various other systems and devices to be coupled to the IHS. Through couplings to PCIe connectors 245a, a variety of data storage devices, graphics processors and network interface cards may be coupled to server IHS 200, thus supporting a wide variety of topologies of devices that may be coupled to the server IHS 200 and that may be used in supporting redundant data storage systems. In some embodiments, telemetry generated by each removeable hardware component coupled via PCIe connectors 245 may be designated within a telemetry chain of server IHS 200 as auxiliary telemetry.

As illustrated, server IHS 200 includes a remote access controller 230 that supports remote management of server IHS 200 and of various internal components of server IHS 200. In some embodiments, remote access controller 230 may be of similar capabilities to the remote access controller 155 of personal IHS 100. However, in many instances, remote access controller 230 of server IHS 200 may have greater capabilities in all or nearly all regards in comparison to the remote access controller 155 of personal IHS 100.

As with the remote access controller 155 of personal IHS 100, remote access controller 230 may operate from a different power plane from the processors 205 and other components of server IHS 200, thus allowing the remote access controller 230 to operate, and management tasks to proceed, while the processing cores of server IHS 200 are powered off. Various functions provided by the BIOS, including launching the operating system of the server IHS 200, and/or functions of a TPM may be implemented or supplemented by the remote access controller 230. In some embodiments, the remote access controller 230 may perform various functions to verify the integrity of the server IHS 200 and its hardware components prior to initialization of the operating system of server IHS 200 (i.e., in a bare-metal state). In some embodiments, certain operations of the remote access controller 230, such as the operations described herein for support of adaptive telemetry collection in zero-trust computing environments, may operate using validated instructions, and thus within the root of trust of server IHS 200.

As with the remote access controller 155 of personal IHS 100, remote access controller 230 may include a service processor 230a, or specialized microcontroller, that operates management software that supports remote monitoring and administration of server IHS 200. The management operations supported by remote access controller 230 may be remotely initiated, updated and monitored via one or more remote management interfaces. Remote access controller 230 may be installed on the motherboard or backplane of server IHS 200 or may be coupled via an expansion slot or other connector provided by the motherboard. In some instances, the management functions of the remote access controller 230 may utilize information collected by various sensors 225 located within the IHS. For instance, temperature data collected by sensors 225 may be utilized by the remote access controller 230 in support of closed-loop airflow cooling of server IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of server IHS 200. In some embodiments, the remote access controller 230 may additionally or alternatively use MCTP messaging to transmit Vendor Defined Messages (VDMs) via the in-line PCIe switch fabric supported by PCIe switches 265a-b. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230b of the remote access controller 230.

As illustrated, remote access controller 230 may include a network adapter 230c that provides the remote access controller with network access that is separate from the network controller 240 utilized by other hardware components of the server IHS 200. Through secure connections supported by network adapter 230c, remote access controller 230 communicates management information with remote management interfaces. In support of remote monitoring functions, network adapter 230c may support connections between remote access controller 255 and external management tools using wired and/or wireless network connections that operate using a variety of network technologies.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the server IHS 200 through the operation of an I2C multiplexer 230d of the remote access controller. As illustrated in FIG. 2, the managed devices 205, 235a-b, 240, 250, 255, 260 of server IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the server IHS 200. The I2C co-processor 230b may be a specialized co-processor or micro-controller that is configured to implement a I2C bus interface used to support communications with managed hardware components 205, 235a-b, 240, 250, 255, 260 of the IHS. In some embodiments, the 12C co-processor 230b may be an integrated circuit on the same die as the service processor 230a, such as a peripheral system-on-chip feature that may be provided by the service processor 230a. The sideband 12C bus 255 is illustrated as single line in FIG. 2. However, sideband bus 255 may be comprises of multiple signaling pathways, where each may be comprised of a clock line and data line that couple the remote access controller 230 to 12C endpoints 205, 235a-b, 240, 250, 255, 260.

As with the remote access controller 155 of personal IHS 100, the remote access controller 230 of a server IHS 200 may support a secure execution environment in which management processes may operate. In the same manner as personal IHS 100, management of an sever IHS 200 may include the collection of telemetry that is generated by the software and hardware of the IHS. In the same manner as personal 100, the management processes operating within the secure execution environment of the remote access controller 230 may include an adaptive telemetry orchestrator that supports the based adaptive collection of telemetry by managed hardware components of the sever IHS 200, and further supports adaptive transmission of the collected telemetry within the zero-trust computing environment.

In some embodiments, the adaptive telemetry orchestrator of the remote access controller 230 receives instructions for the adaptive collection and transmission of telemetry in the form of a telemetry definition, where this telemetry definition may be identical to the telemetry definition that is used in adapting the telemetry that is collected and transmitted by a personal IHS 100. In some embodiments, a policy decision point of a zero-trust computing environment provides the adaptive telemetry orchestrator implemented by remote access controller 230 with a telemetry definition that specifies the telemetry requested by the policy decision point, where the telemetry transmitted to the policy decision point may be used in securing access that is provided to resources that are protected by the zero-trust computing environment. As described in additional detail below, in some embodiments, a telemetry definition may specify adjustments to the telemetry to be collected, such as adjusting the telemetry that is collected with respect to a specific hardware component, user 305, resource 340 or IHS 200, or adjusting the frequency at which telemetry is collected and/or transmitted, or adjusting sensor fidelity, etc.

In addition, as with personal IHS 100, a telemetry definition may specify remediation procedures to be initiated by the telemetry orchestrator with respect to one or more indicators of attack that have been detected within the zero-trust computing environment. In particular, the remediation procedures in the telemetry definition may specify a security delay to be implemented by the telemetry orchestrator, where the security delay provides opportunity for the telemetry system to be ruled out as a contributor to the indicators of attack that have been detected. In some embodiments, the remote access controller 230 may support operations of the telemetry orchestrator in adapting telemetry and collection during a security delay.

As described, a remote access controller 230 may support sideband communication capabilities with managed hardware components of an server IHS 200 and with external management tools and resources. These sideband communication pathways and various inband signaling pathways may be available to the adaptive telemetry orchestrator for use in configuring the telemetry that is collected and in reported the collected telemetry. For collected telemetry that is ready for transmission, the adaptive telemetry orchestrator may determine whether to delay transmission of that telemetry due to a security delay, where the telemetry that is selected for delayed transmission may be based on the position of that telemetry in the telemetry chain of the IHS 200.

In some embodiments, the adaptive telemetry orchestrator that is operated by the remote access controller 230 may parse the requested adjustments to the available telemetry streams from a received telemetry definition. As with personal IHS 100, In some embodiments, the telemetry definition may also specify a telemetry chain for use in the selection of telemetry streams that are to be authenticated, and for selection of the signaling pathways for transmission of each stream of telemetry that is being collected by the server IHS 200.

As with the personal IHS 100, remote access controller 230 may implement out-of-band communications pathways that are isolated from the operating system and computing components of server IHS 200, where such out-of-band communication capabilities of remote access controller 230 may include a network adapter 230c that is distinct from main network controller 240 utilized by the operating system of server IHS 200. In some embodiments, telemetry definitions may be transmitted to an adaptive telemetry orchestrator operating on remote access controller 230 through such out-of-band communications channels supported by network adapter 230c in order to ensure adaptations to telemetry collection are made during periods of resource contention, when the telemetry adaptations may be needed most.

In various embodiments, a server IHS 200 does not include each of the components shown in FIG. 2. In various embodiments, a server IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
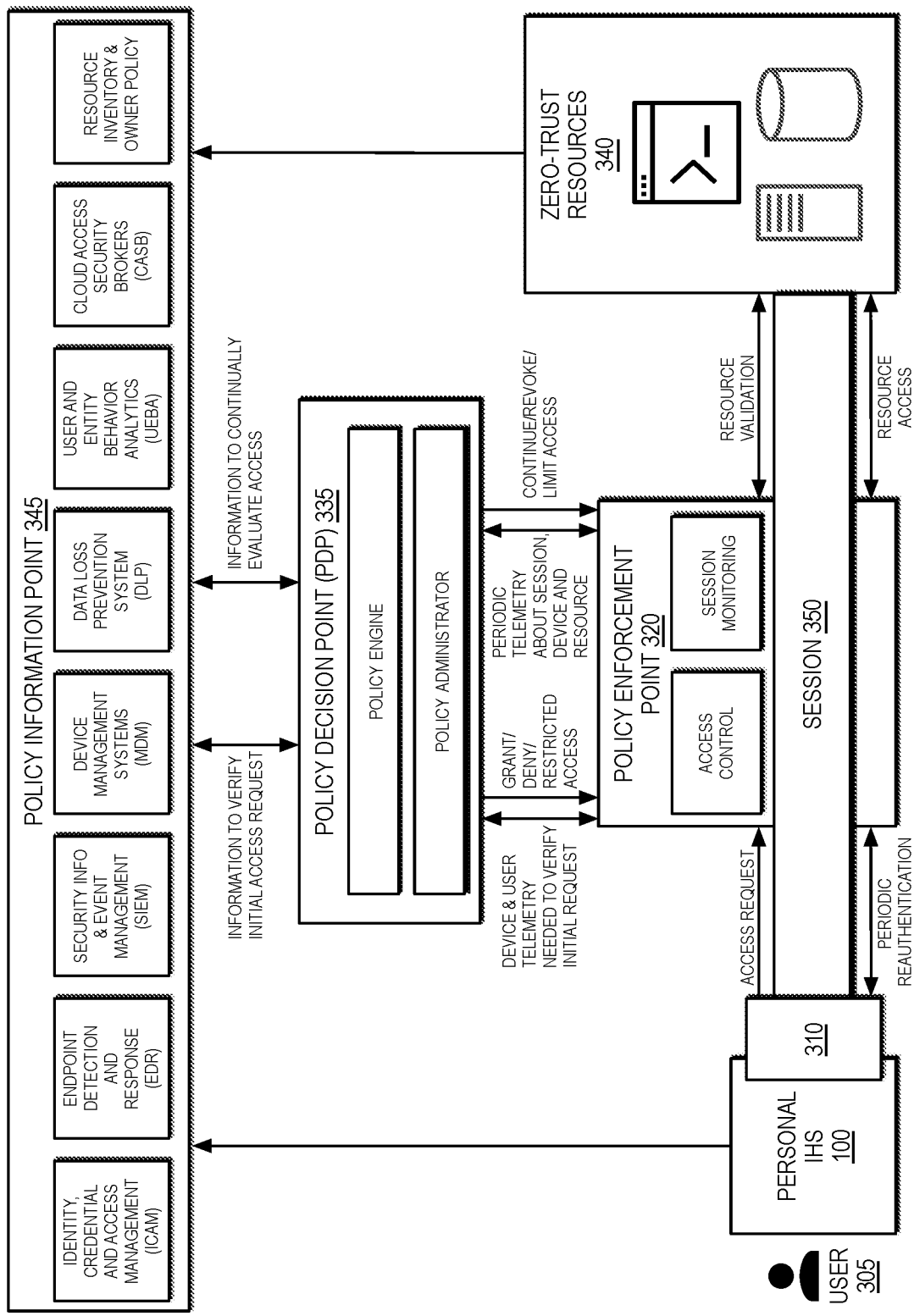
FIG. 3 is a diagram illustrating certain components of zero-trust computing environment configured, according to some embodiments, to support security-linked telemetry by IHSs participating in the zero-trust computing environment.

FIG. 3 is a diagram illustrating certain components of a zero-trust computing environment 300, according to some embodiments, that is configured to support security-linked collection and transmission of telemetry by participants in the zero-trust environment. As described, a zero-trust computing environment may be implemented using one or more server IHSs 200 and may be used in providing users of personal IHSs 100 with access to resources 340 that are protected by the zero-trust computing environment 300. In embodiments, telemetry data collected throughout the zero-trust computing environment may be quickly adapted through the use of telemetry definitions that are generated by a policy decision point 335 of the zero-trust computing environment 300 and that are disseminated to participant IHSs in the zero-trust computing environment, whether the participants may be personal IHSs 100 or server IHSs 200. In some embodiments, a telemetry definition may specify adjustments to the telemetry to be collected. For instance, a telemetry definition may specify remediation procedures to be initiated by an IHS 100, 200 with respect to one or more indicators of attack that have been detected within the zero-trust computing environment. In particular, the remediation procedures in the telemetry definition may specify a security delay to be implemented by the IHS 100, 200, where the security delay provides opportunity for the telemetry system of the IHS to be ruled out as a contributor to the indicators of attack that have been detected.

A variety of hardware and software resources may be designated as zero-trust resources 340 within a zero-trust environment 300. A zero-trust environment 300 operates on the principle of continuous verification and strict access controls for hardware, software and data that have been designated as zero-trust resources 340. In the zero-trust environment 300, every user 310 (e.g., a human user or a process), personal IHS 100 and/or server IHS 200 that is a zero-trust resource requestor is always untrusted. The zero-trust environment 300 may utilize multiple layers of security controls, such as multifactor authentication, encryption, and network segmentation in implementing policies that govern access to zero-trust resources 340. Each user 310, personal IHS 100 and/or server IHS 200 is individually authenticated and authorized when requesting access to a zero-trust resource 340, such that access is granted strictly on a need-to-know basis. In this manner, a zero-trust environment 300 minimizes the attack surface that is presented by providing access to a zero-trust resource 340.

In a zero-trust environment 300, a policy enforcement point (PEP) 320 serves as a gatekeeper that controls access to zero-trust resources 340 based on one or more applicable policies 350. The policy enforcement point 320 serves as a mediator between the personal IHS 100 of the user 305 and the zero-trust resources 340. The policy enforcement point 320 may employ various security mechanisms to securely identify the user 310 and/or personal IHS 100 that is requesting access to a zero-trust resource 340 in order to ensure that only authorized and trusted entities are evaluated for access to the requested zero-trust resource 340, where this access is determined by a policy decision point 335 based on one or more applicable policies.

Figure 4:
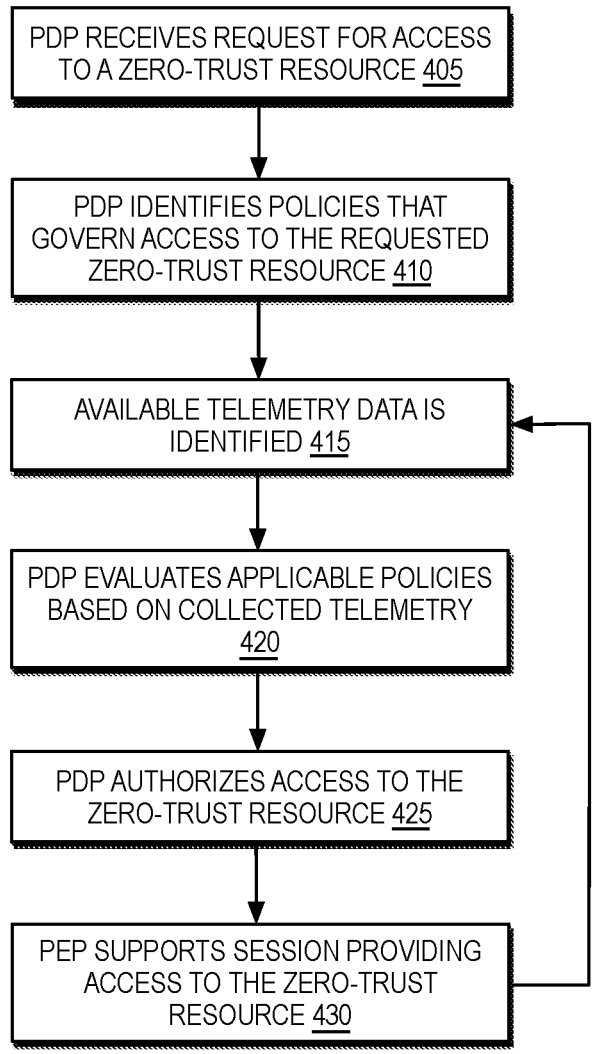
FIG. 4 is a flowchart depicting illustrative aspects of methods for security-linked telemetry collection by IHSs participating in the zero-trust computing environment.

A policy decision point 335 is responsible for making access-control determinations for zero-trust resources 340, where such determinations are made based on the evaluation of policies that may utilize various streams of telemetry as inputs. The policy decision point 335 implements the logic within a zero-trust environment 300 that determines whether requested access to a zero-trust resource 340 will be granted. As indicated in FIG. 4, at 405, the policy decision point 335 receives access requests from users 310 operating a personal IHS 100, where the request are typically made through a policy enforcement point 320. Upon receipt of a request, at 410, the policy decision point 335 identifies the policies that govern access to the requested resource 340 by the user 305 that is operating personal IHS 100.

As described, these access-control policies may rely on various types of data. Inputs to polices may include information other than telemetry data, such as information identifying the user 305 and/or IHS 100 that is requesting access to a protected resource 340. Other policy inputs may include any data available through the policy information point 345. Policies may also utilize inputs that are provided by telemetry collected within the zero-trust computing environment. For instance, policies may restrict access to a protected resource 345 to scenarios where the user 305 can be verified as in actual physical proximity to the personal IHS 100, thus mitigating risks posed by onlookers. In some embodiments, such user presence information may be provided in the form of telemetry information that is made available to the policy decision point 335 in determining whether to grant or to continue granting access to a protected resource 345.

Through the evaluation of collected telemetry based on applicable policies, at 420, the policy decision point 335 determines whether the requested access should be granted or denied. Based on available telemetry, the policy decision point 335 may dynamically assess the risk associated with each access attempt based on a variety of context information that is represented in the available telemetry. The policy decision point 335 may incorporate telemetry from various sources within the zero-trust environment 300 in evaluating a request for access to a zero-trust resource 340. When the access is allowed based on evaluation of the applicable polices, at 425, the policy decision point 335 authorizes access to the protected resource 345, where the restrictions set forth in these access control policies remain in place while the protected resource is being accessed. As indicated in FIG. 3 and at 430 of FIG. 4, the policy enforcement point 320 establishes a session 320 that provides the personal IHS 100 with access to the protected resource 340.

A policy decision point 335 may evaluate access requests based on policies that may consider a variety of contextual factors that are characterized through collected telemetry, where access to any of the zero-trust resources 340 may be governed by policies that have been selected and adapted specifically for the protection of a specific zero-trust resource 340. In an illustrative example, polices evaluated by a policy decision point 335 may assess various security characteristics of the personal IHS 100 that is requesting the access, or from which the request is being issued by a user 310. For instance, the polices may evaluate characteristics of the requesting personal IHS 100 such as whether security protocols are supported by the requesting device, and thus whether the requesting device can successfully respond to challenges issued by the policy decision point 335.

In some instances, policy decisions by a policy decision point 335 may be based on the identity of the user 310 and/or personal IHS 100, where the identity validations may be made using information such as usernames, passwords, or biometric data. For example, policies that govern access to a zero-trust resource 340 may require biometric authentication of the user 310 requesting the access. In some embodiments, access to a protected resource requires continuous biometric validation of the user via facial recognition techniques supported by sensor hub 150, such that access may be revoked upon user-presence telemetry indicating the user is no longer in close enough proximity for facial recognition to be used in identifying the user and/or in distinguishing the user from other individuals in proximity to the IHS.

In another illustrative example, polices evaluated by a policy decision point 335 may assess location and network context information in making access determinations. For instance, polices 350 may consider the geographic location of the user 310 and/or personal IHS 100, such as in restricting access to a zero-trust resource 340 to users 310 that are physically located at a restricted-access environment. Other policies may consider network information such as whether the user's request for access is received from an untrusted network. In this manner, a variety of policies may govern access to a zero-trust resource 340 through the evaluation of these policies by a policy decision point 335.

In various scenarios, a policy decision point 335 may receive an indication of a change in a risk posture within the zero-trust computing environment, such as a result of an increase in activity in proximity to the IHS. As illustrated in FIG. 3, the zero-trust computing environment 300 includes a policy information point 345 that serves as a source of information for the policy decision point 335. In many instances, the policy information point 345 provides information necessary to identify a user that is requesting access to a protected resource 340, such as information for implementing password identification of the requesting user. In supporting such capabilities, the policy information point 345 may interface with various external systems and information sources, which may provide the policy decision point 335 with risk posture information related to sessions 350 that are being used to access protected resources 340. In some instances, some or all of the telemetry generated by participating IHSs 100, 200 may be reported to a policy information point 345.

As illustrated in FIG. 3, policy information point 345 may support the policy decision point 335 by providing access to various sources of information about users 305, user roles, IHSs 100 and 200 (e.g., supported telemetry chains, detected indicators-of-attack), security postures and properties of the protected resources 340. Through interfacing with various data sources, the policy information point 345 provides a policy decision point 335 with timely and relevant information for use making informed access control decisions. In order to support continuous validation of users 305 access to a protected resource 340, the policy information point 345 must have access to timely information that reflects the current risk posture of an ongoing session 350 being used to provide the access.

The information collected and evaluated by policy information point 345 includes telemetry data the is collected and transmitted from participant IHSs 100, 200 in the zero-trust computing environment 300, where the IHS participants include both the personal IHSs 100 of user's requesting access to protected resources 340 and the server IHSs 200 that are used in implementing the zero trust network. Without timely telemetry data, the policy information point 345 may be unable to provide a policy decision point 335 with accurate information about the current risk posture related to an ongoing session 350. For instance, in a scenario where user 305 is requesting access to a protected resource 340 from a personal IHS 100 that is portable, providing the policy information point 345 with timely telemetry data that indicate location changes allows accurate access determination decisions to be made by the policy decision point 335.

Embodiments thus support adaptive telemetry within a zero-trust computing environment, where the telemetry is collected and transmitted according to telemetry definitions created by policy decision points of the zero-trust computing environment, where the telemetry adaptations include delaying transmission of certain telemetry, that may be selected based on the positions of the telemetry within a telemetry chain in use by that IHS 100, 200, in order to allow remediation procedures specified in the telemetry definition to be implemented, thus allowing an opportunity to determine whether the telemetry system is contributing to the detected condition.

Figure 5:
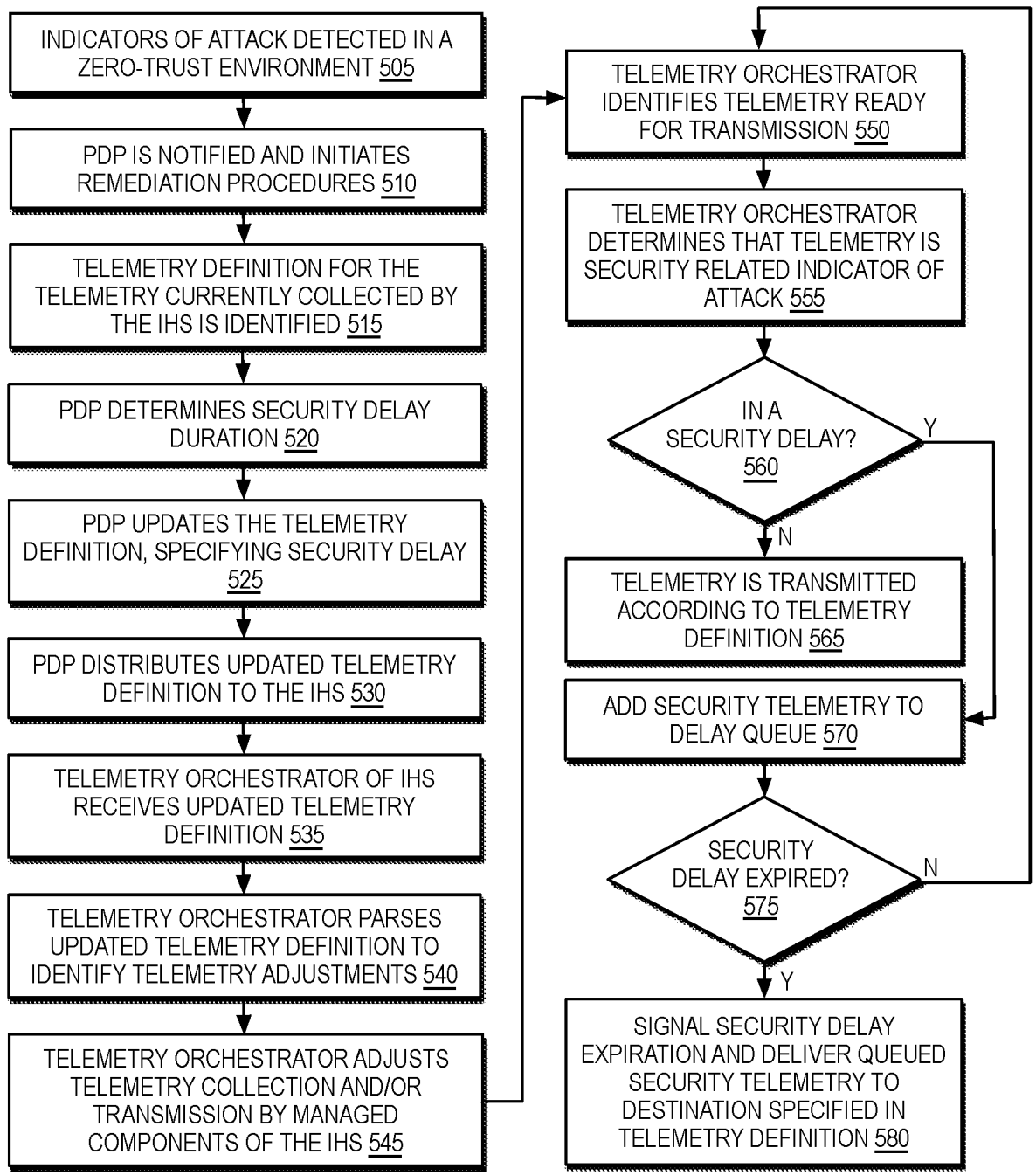
FIG. 5 is a flowchart depicting illustrative aspects of methods for security-linked telemetry collection by IHSs participating in the zero-trust computing environment.

FIG. 5 is a flowchart depicting illustrative aspects of methods for security-linked transmission of telemetry collected by IHSs participating in the zero-trust computing environment. As described, access to resources protected by the zero-trust computing environment may be governed by policies that utilize telemetry data as inputs. As described above, the collection of telemetry can generate overwhelming amounts of data when fully enabled. The collection and transmission of significant amounts of telemetry data can negatively affect an IHS that may already be in a state of resource exhaustion. In a zero-trust computing environment in which the access to protected resources is continuously validated, accurate decision making requires access to current telemetry data. Some traditional systems may store telemetry data for off-line processing, such as to identify threat patterns, identify any indications of malicious activity or train machine learning systems. Such telemetry systems are not adequate for support of continuous validation of access to protected resources.

Accordingly, embodiments provide capabilities for supporting timely collection and transmission of telemetry in a zero-trust computing environment, in particular for supporting adaptive transmission of telemetry that allows the transmission path used for delivery of telemetry to be quickly adapted in response to changing conditions that affect the risk posture in which a protected resource 340 is being accessed, and that allows quick configuration of the remediation procedures in response to detected indicators-of-attack. For instance, the risk posture of some or all operations by a participant IHS 100, 200, including accessing a protected resource, may increase due to a variety of conditions that may be detected by a policy information point based on telemetry or other information that may be collected and evaluated by the policy information point.

Some embodiments may begin, at 505, with the detection of indicators-of-attack or other change in risk posture. In some embodiments, the indicators-of-attack may be identified by the policy information point 345 based on external data sources, such as threat libraries, and internal data sources, such as internal threat patterns generated by analysis of historical telemetry data. In some embodiments, the indicators-of-attack with respect to a participating IHS 100, 200 may be triggered by telemetry generated by that IHS, such as user-presence telemetry that indicates that multiple unidentified individuals have been detected in close proximity to the IHS. In some embodiments, a indicators-of-attack may be triggered based on a failure to validate a hardware component by a participant IHS 100, 200, in particular due to a failure to validate the firmware or other hardware settings in use by individual hardware components of the IHS. In scenarios where indicators-of-attack are detected, embodiment may initiate remediation procedures for adjusting the collection of telemetry in response to the indicator-of-attack.

Based upon detecting indicators-of-attack or another change in risk posture, at 510, a notification may be provided to the policy decision point 335. In some embodiments, the a policy information point 345 may provide the policy decision point 335 with additional information characterizing the detected indicators-of-attack or other change to the risk posture of the IHS 100, 200. The notification that is provided may include a variety of information regarding the change in risk posture and/or regarding additional telemetry that is known by the policy information point 345 as being available for collection within the zero-trust computing environment 300. For instance, the notification may specify indicators-of-attack associated with the user 305 have been detected, such as due to the user 305 issuing multiple failed attempts to access a protected resource 340.

In another illustrative example, the notification may specify indicators-of-attack associated with the personal IHS 100, such as due to use of outdated security protocols or due to indications the personal IHS 100 is being targeted by suspicious activities that originate externally to the zero-trust computing environment. In another illustrative example, the notification may specify indicators-of-attack associated with a protected resource, such as due to a detected lapse in security protocols in use by that protected resource (e.g., use of expired security certificates). In another illustrative example, the notification may specify indicators-of-attack that are an overall increase in risk throughout the zero-trust computing environment 300, or within a portion of the zero-trust computing environment, such as within a group of server IHSs 200 that represent a computing cluster used in implementing the zero-trust computing environment. In analogous manners, in each of these scenarios, a notification may instead specify reductions in indicator-of-attack risk factors associated with a user 305, IHS 100, 200 and/or protected resource 340.

Upon receipt of such notifications of indicators-of-attack or other changes in risk posture with respect to an IHS, at 515, the policy decision point 335 identifies one or more telemetry definitions that specify the telemetry collection and transmission by that IHS, whether a personal IHS 100 or a server IHS 200 used in implementing the environment. In some embodiments, each personal IHS 100 that is participating in the zero-trust computing environment may be configured to collect and transmit telemetry for the zero-trust computing environment based on a telemetry definition. In some embodiments, telemetry collected and transmitted by server IHSs 200 that implement the zero-trust computing environment may also be specified in telemetry definitions. In some instances, the exact same telemetry definition may be used in the configuration of telemetry by personal IHSs 100 and server IHSs 200 that are participants in the zero-trust computing environment.

In implementations where multiple policy decision points 335 are present in a zero-trust computing environment, an individual policy decision point may be designated as the adaptive telemetry policy decision point that is responsible for configuring the telemetry that is being collected and transmitted for use within the zero-trust computing environment. Accordingly, the designated adaptive telemetry policy decision point 335 may maintain a listing of the telemetry definitions currently in use in the zero-trust computing environment. In some embodiments, the telemetry of each participating IHS may be individually configured using a distinct telemetry definition that may specify unique telemetry collection and transmission for a single IHS.

In some embodiments, the telemetry of groups of participating IHSs may be collectively configured through the use of telemetry definitions that are applicable to groups of IHSs. For instance, embodiments may utilize telemetry definitions that can be used in configuring the telemetry of all personal IHSs 100 of a particular type, such as all personal IHSs of a particular model or all personal IHSs that are running a particular version of an operating system. Or in another illustrative example, embodiments may utilize separate telemetry definitions for configuring telemetry collected and transmitted by the server IHSs 200 that are being used in implementing the zero-trust computing environment. Using such a telemetry definition, embodiments may adjust telemetry collection and/or transmission by the server IHSs 200 that are implementing the zero-trust computing environment, without affecting the telemetry of the personal IHSs 100 that are utilizing the zero-trust computing environment.

Once the telemetry definition for an IHS has been identified, at 520, the policy information point 535 identifies whether the remediation procedures should include a security delay. In some embodiments, the remediation procedures included in the telemetry definition may specify a security delay to be implemented by the IHS 100, 200, where the security delay provides opportunity for the telemetry system to be ruled out as a contributor to the indicators of attack that have been detected. Embodiments may support configurable security delays, where longer delays may be selected during periods of resource contention within the zero-trust computing environment or in response to specific indicators-of-attack that are warnings rather than indicators of an actual suspected breach of security protocols. Shorter security delays maybe be selected for critical indicators-of-attack for which the telemetry system is given a short duration for being ruled out as a contributor to the indicator of attack. In some embodiments, a destination for transmission of telemetry that is queued during a security delay may also be selected, such as specialized module of the policy information point, may be selected for delivery once the security delay has expired.

Based on the telemetry that is currently being collected, changes in security posture, and based on the security delay determinations in response to indicators-of-attack, at 525, the policy decision point 335 identifies any changes to the telemetry that should be collected and transmitted, where such changes are made via updates to the telemetry definitions in use by the participant IHSs 100, 200. In a scenario where the policy information point 345 has detected a indicators-of-attack with respect to a specific protected resource 340, such as a specific database, the adaptive telemetry policy decision point may increase telemetry with respect to sessions 350 used to access that database. For instance, the adaptive telemetry policy decision point may identify all active sessions 350 that are hosted by the policy enforcement point 320 and that are being used to access that particular database. Based on information provided by the policy enforcement point 320, the policy decision point 335 may identify the personal IHSs 100 that are being used in each of these sessions 350 that is accessing the database. The adaptive telemetry policy decision point may then identify the respective telemetry definitions that are currently in use by each of these personal IHSs 100 that are currently being used to access the database.

In scenarios where a failure to validate the firmware or other hardware setting detected for use by a hardware component of an IHS 100, 200, embodiments may adjust telemetry collection only with respect to that specific hardware component. For instance, the updated telemetry definition may specify an increase in all available network telemetry by a network controller 125 that has failed validation, such as the collection of all available network telemetry targeted at a session 350 used to access a highly-protected database. In some instances, the updated telemetry definition for a personal IHS 100 may specify an increase in all available telemetry for that the failed hardware component and all similar components, such as for all storage drives of the same type as a storage drive that has failed validation. In some instances, the updated telemetry definition for a personal IHS 100 may specify an increase in telemetry by all applications accessing the failed hardware component. In some embodiments, the updated telemetry definition may specify an increase in telemetry related to certain subsystems of the IHS. For instance, upon detecting a validation failure by hardware accelerator 250, the remote access controller may be used to identify all coupled storage drives 235*a*. Embodiments may adjust telemetry for all hardware within this subsystem.

In some embodiments, the signaling pathway used for transmission of telemetry by hardware components that have failed validation may be selected based on the telemetry chain for that IHS. For a hardware component that has failed validation, telemetry that is generated by that hardware component may be designated within a telemetry chain as error telemetry. Within the telemetry definition of the IHS, a transmission destination may be specified for some or all of the telemetry designated as error telemetry. For instance, error telemetry may be directed to a specialized module of the policy information point 345 that evaluates such data to identifier remediation procedures. As described in additional detail below, an adaptive telemetry orchestrator that operates on the IHS may distribute telemetry of an IHS according to a telemetry definition of that IHS. Upon detecting telemetry from a hardware component that has failed validation, or failed another security requirement, such that telemetry from that component is designated as error telemetry, the adaptive telemetry orchestrator may consult the telemetry chain for the signaling pathway for use in transmission of error telemetry. For instance, the telemetry chain may specify the use of sideband signaling for telemetry that is designated as error telemetry.

In some embodiments, the policy information point 345 may detect indicators-of-attack with respect to a specific protected resource 340, such as a specific database. In response, the adaptive telemetry policy decision point may adjust telemetry with respect to sessions 350 used to access that database. For instance, the adaptive telemetry policy decision point may identify all active sessions 350 that are hosted by the policy enforcement point 320 and that are being used to access that particular database. Based on information provided by the policy enforcement point 320, the policy decision point 335 may identify the personal IHSs 100 that are being used in each of these sessions 350 that is accessing the database. The adaptive telemetry policy decision point may then identify the respective telemetry definitions that are currently in use by each of these personal IHSs 100 that are currently being used to access the database. For each of these telemetry definitions, the adaptive telemetry policy decision point may update the telemetry that is to be collected by these personal IHSs 100.

In a scenario where the policy information point 345 has detected indicators-of-attack with respect to a specific user 305, such as a specific employee or student, the adaptive telemetry policy decision point may increase telemetry with respect to that user 305. In doing so, the adaptive telemetry policy decision point may identify the telemetry definition that is currently in use by the personal IHS 100 being operated by the user 305. For this telemetry definition, the adaptive telemetry policy decision point may update the telemetry that is to be collected by this personal IHS 100. In some embodiments, the updated telemetry definition for a personal IHS 100 may specify an adjustment in all available telemetry that is related to this user 305. In some embodiments, the updated telemetry definition may also request transmission of all collected telemetry related to this user 305, since the personal IHS 100 may have significant collected telemetry that is being stored for later transmission to the policy information point 345, or external systems accessed by the policy information point 345. Through such embodiments, an updated telemetry definition provides a capability for quickly adjusting telemetry related to a specific user 305, and in requesting all available telemetry related to this user 305. In some embodiments, this request for telemetry regarding user 305 may be issued to all other personal IHSs determined to be in physical proximity to the personal IHS 100 of this user 305, thus supporting extended monitoring of activities by a particular user 305 with respect to other personal IHSs that are participants in the zero-trust computing environment.

In such scenarios where all collected telemetry related to a user 305 and/or IHS 100 is being requested via an updated telemetry definition, a signification amount of telemetry data may be transmitted in response to such a request. In some embodiments, the transmission of all stored telemetry may be designated within a telemetry chain as bulk telemetry. Within the telemetry definition of the IHS, a transmission destination may be specified for some or all of the telemetry designated as bulk telemetry. For instance, bulk telemetry may be directed to a destination in the policy information point 345 for machine learning evaluation of the data, such as in identifying threats related to the user 305. The adaptive telemetry orchestrator operating on the IHS may receive the telemetry definition and adjust transmission of detected bulk telemetry accordingly. The adaptive telemetry orchestrator may consult the telemetry chain for the signaling pathway for use in transmission of bulk telemetry.

In some embodiments, the policy information point 345 may detect a change in risk posture with respect to a group of personal IHSs 100, such as due to the same validation failure having been detected in a group of employee-issued laptops. In some embodiments, the policy decision point 335 may generate a single updated telemetry definition that can be used to adjust the telemetry on all of the personal IHSs 100 in this group. In this manner, embodiments support a capability for quickly adjusting the telemetry that is generated by an individual IHS or by groups of IHSs while using a single telemetry definition, based on whether the telemetry definition is distributed to the individual IHS or to the group of IHSs.

Based on information provided by the policy enforcement point 320, the adaptive telemetry policy decision point may identify all active sessions 350 hosted by the policy enforcement point 320 that are being used to provide the user 305 with access to a protected resource 340. In some embodiments, all participating IHSs that are part of these sessions 350 may be instructed through updated telemetry definitions to increase or otherwise adjust telemetry related to this user 305, whether the IHS is a personal IHS 100 or a server IHS 200. Through such updates, embodiments may modify the telemetry collected by server IHSs 200 that are used to implement the zero-trust computing environment, where the telemetry modifications provide adjusted telemetry for use in tracking the operations of the user 305. The generated telemetry provides increased visibility into the actions of this particular user 305 throughout all of their operations in the zero-trust computing environment.

As described above, a personal IHS 100 may support collection of sensor data that may be used in generating user-presence telemetry that may provide indications of the user's physical location relative to the personal IHS 100. In some embodiments, the updated telemetry definition for a personal IHS 100 may specify an increase in such user-presence telemetry related to this user 305. The updated telemetry definition may specify an increase in all available user-presence telemetry related to user 305, or may specify an increase in certain user-presence telemetry, such as only in telemetry indicating whether the user is currently detected in proximity to the personal IHS 100, without regard to the user's 305 position relative to the personal IHS 100. The updated telemetry definition may thus also specify an increase in all user proximity and positioning telemetry, thus tracking whether the user 305 is in a position to operate the IHS and to ensure no onlookers are in proximity to the personal IHS 100.

In scenarios where modifications are being made to the telemetry that is to be queued during a telemetry chain, adjustments to the telemetry that is to be delayed during a security event may be made via modifications to the telemetry chain in use by an IHS. In some embodiments, the policy decision point 335 may adjust the ordering of the telemetry classifications within the telemetry chain that is used by an IHS. As described, in some embodiments, an adaptive telemetry orchestrator operating on the IHS may be configured to delay delivery that is categorized as indicatorsof-attack within the categorizations of the telemetry chain. In some embodiments, the adaptive telemetry orchestrator is further configured to delay delivery of all telemetry data that is classified lower in the telemetry chain relative to the position of indicator-of-attack telemetry within the telemetry chain. Through re-ordering of the elements of the telemetry chain, the policy decision point may adjust the telemetry streams that are selected for delayed delivery, without the policy decision point having detailed knowledge of the actual telemetry that is being transmitted. Upon making any such adjustments to the telemetry chain, the updated telemetry chain is included in the updated telemetry definition.

In some embodiments, the transmission of certain telemetry may be limited due to restrictions on sharing of personal data related to the user 305 of a personal IHS 100. For instance, restrictions may prohibit sharing of a user's 305 current location, and thus of the location of the personal IHS 100. In such instances, instructions provided in a telemetry definition by a policy decision point may be contrary to these restrictions on sharing of personal data. In some embodiments, the local telemetry orchestrator in operation on a personal IHS 100 may be configured to identify request for restricted information and to configure the generation of telemetry that provides generalized information. For instance, when sharing of a user's location is restricted, the local telemetry orchestrator may configure the generation of location telemetry that only specifies a general location of the personal IHS 100, such as in a city, state, zip code, area code or other geographic area. In another scenario where sharing of user's proximity information is restricted, the local telemetry orchestrator may configure the generation of location telemetry that only specifies where an individual is detected in proximity to the IHS without attempting to identify that individual as the user 305.

In an illustrative scenario, embodiments may adjust the transmission pathways for delivery of telemetry that includes personal data. For instance, the policy decision point 335 may adjust the transmission of telemetry by personal IHS 100 in order to direct telemetry including personal data through in-band signaling pathways, so that in-band privacy screening tools that identify and scrub personal data from the telemetry are not circumvented.

In some embodiments, the updates made to telemetry definition may specify when and where to transmit the collected telemetry is transmitted. In many instances, telemetry that is collected by an IHS is stored and transmitted to external systems in batches, where these transmissions may be conducted during idle intervals. In some embodiments, the telemetry definition may specify destinations for delivery telemetry that was queued during a security delay. As described, a policy information point 345 may utilize telemetry in a variety of manners, such as in identifying usage patterns and deviations that indicate risks or errors. For such use of telemetry by a policy information point 345, the batching of collected telemetry for delayed transmission does not present unacceptable delays. However, for a policy decision point 335 that is responsible for continuous validation of access to a protected resource 340, more responsive telemetry is required.

In embodiments, a telemetry definition may specify multiple destinations for the transmission of some or all of the telemetry being collected according the telemetry definition. Accordingly, through updates to a telemetry definition, a policy decision point 335 may specify the transmission of telemetry to both the policy information point 345 and to a policy decision point 335. The telemetry transmitted to the policy information point 345 may be used in historical and other analytical evaluation of the data, such as in machine learning identification of threat patterns. The telemetry transmitted to the policy decision point 335 may be used in evaluating a user's ongoing access to a protected resource 340, such as in providing user-proximity telemetry information for use in determining whether to revoke access to a protected resource 340. In embodiments, such capabilities are provided through the use of a single telemetry definition that specifies the telemetry to be collected by a participating IHS, and the destinations for transmission of that telemetry.

In some embodiments, a telemetry definition may specify a change to a level of telemetry that is supported by IHSs 100, 200. In such embodiments, the telemetry that is available for collection may be tiered, with a base tier of high-priority telemetry and a top tier of lowest-priority telemetry. For instance, streams of telemetry available for collection by an IHS may be designated according to three tiers. A base tier of telemetry may be operational, high-priority telemetry that is used in supporting the secure operations of the zero-trust computing environment, such as heart-beat telemetry, security notifications and telemetry being used to support validation of continued access to a protected resource. A middle tier of telemetry may be analytical telemetry that will used processed by various monitoring operations, such as in monitoring for changes in risk posture (e.g., such as the use telemetry to detect possible onlookers in close proximity to an IHS). A bottom tier of telemetry may be optional telemetry such as bulk transfer of telemetry for off-line processing and telemetry providing recommendations such as identifying software or firmware upgrades. By specifying in the telemetry definition specific tiers of telemetry that are to be enabled, a policy decision point may adapt the telemetry of personal IHS in a manner that restricts the telemetry that is transmitted by a personal IHS without any knowledge of the specific telemetry that is available for collection by that IHS, or that is currently being collected by that IHS. In some embodiments, these tiers of telemetry may correspond to the designations used in the telemetry chain that is specified in a telemetry definition and used to adjust the telemetry that queued during a security delay.

Once the telemetry updates in response to the change in risk posture have been identified, at 525, the adaptive telemetry policy decision point 335 updates the telemetry definitions for one or more personal IHSs 100. As described, the updates to the telemetry definition may specify adjustments to the various telemetry streams that are supported by the personal IHS 100 and/or server IHS 200, where adjustments in telemetry may be specified with respect to specific users 305, personal IHSs 100, protected resources 340 and/or specific hardware that has failed validation. Also as described, the adjustments to the telemetry definition of the IHS 100, 200 may specify a security delay that is to be initiated by the IHS upon receipt of the telemetry definition, where a duration for the security delay may also be specified in the telemetry definition. At 530, the adaptive telemetry policy decision point 335 transmits the updated telemetry definition to the IHS(s) 100, 200 for which telemetry adjustments are being made.

As described with regard to FIGS. 1 and 2, an IHS 100, 200 may operate an adaptive telemetry orchestrator that is configured to receive telemetry definitions and to configure the collection and transmission of telemetry by the IHS 100 based on the received telemetry definition. Accordingly, at 535, the adaptive telemetry orchestrator of a personal IHS 100 receives an updated telemetry definition that is directed at the personal IHS 100 by the adaptive telemetry policy decision point 345. Upon receipt, the telemetry definition may be validated as originating from the policy decision point 335.

At 540, the adaptive telemetry orchestrator parses the telemetry definition to identify the telemetry that is to be collected by the personal IHS 100, whether a security delay is being requested by the policy decision point, as well identifying instructions specifying which telemetry is to be queued during a security delay, and where and when the collected telemetry is to be transmitted by the personal IHS 100. As described, the adaptive telemetry policy decision point 335 may specify an increase, decrease or modification in telemetry with respect to user 305, IHS 100, 200, specific hardware components, and/or a protected resource 340 of the zero-trust computing environment. Accordingly, in parsing the telemetry definition, the adaptive telemetry orchestrator identifies the user 305, IHS 100, 200, specific hardware component and/or a protected resource 340 for which telemetry is to be adjusted. In addition, the adaptive telemetry orchestrator parses any additional instructions specified in the updated telemetry definition, such as instructions specifying frequencies at which to collect and transmit telemetry data, and such as one or destinations for delivery of each stream of telemetry that is specified in the telemetry definition. Though the use of such capabilities, embodiments may decrease telemetry frequency during security delay periods, where different frequencies for data collection may be used for each stream of delayed telemetry in order to assess any impacts of telemetry on the operations of an IHS, while still supporting the ability of the policy decision point 335 to provide continuous validation of user access to protected resources 340.

Additional instructions that are specified in the telemetry definition and that are parsed by the adaptive telemetry orchestrator may specify a sensor fidelity to be utilized for a telemetry stream related to a hardware component of personal IHS 100 that is of elevated interest. As described, a personal IHS 100 may generate telemetry based on a variety of sensor 160 inputs, many of which may be operated at different levels of fidelity. In some instances, an increase in sensor fidelity serves to increase the accuracy of sensor measurements, such as for the operation of time-of-flight sensors for user-presence detection, but can exhaust IHS battery power and otherwise cause contention for resources. In some embodiments, the selection of lower fidelity decrease the data that is collected at each interval, and may thus decrease the amount of data that is transmitted as part of each telemetry transmission, thus possibly reducing resource contention contributing to indicators-of-attack that were being generated. For instance, telemetry generated from session 350 information collected by network controller 125 may be generated at different levels of fidelity, thus resulting in additional session information being included in the telemetry that is collected and transmitted. In embodiments, lower sensor fidelity may be specified in an updated telemetry definition for telemetry related to one or more hardware components, thus maintaining insight into the operations of these components, while reducing telemetry resource demands.

As described, a telemetry definition may specify multiple transmission destinations for the collected telemetry, thus supporting the transmission of telemetry to a policy information point 345 for analytical processing and/or to a policy decision point 335 for use in access determinations in support of providing continuous validation of access to protected resources 340. Accordingly, in parsing the telemetry definition, the adaptive telemetry orchestrator may identify instructions the specify the transmission of each stream of telemetry to one or more locations, which may include policy information point 345 locations, one or more policy decision points 335 and/or locations external to the zero-trust computing environment, such as machine learning systems that provide inputs to the policy information point 345.

Based on the information parsed from the updated telemetry definition, at 545, the adaptive telemetry orchestrator adjusts telemetry collection and transmission by managed hardware components of the personal IHS 100. As described with regard to FIG. 1, an adaptive telemetry orchestrator may operate as a process of a secure execution environment of a remote access controller 155 of a personal IHS 100. Also as described, the remote access controller 155 may operate one or more sideband signal pathways 185*a-f* used in the management of hardware components of the IHS. In some embodiments, the adaptive telemetry orchestrator that is operating within a secure execution environment of a remote access controller 155 may translate the telemetry collection instruction that are parsed from the telemetry definition into telemetry adjustments by these managed hardware components 101, 105, 125, 130, 135, 150, 160, 170. For instance, in some embodiments, the adjustments made via the sideband signaling pathways may enable additional telemetry by a managed hardware component that has failed validation, or that is providing critical telemetry, such as voiceprint telemetry, used in validating the user's access to a particular resource. In some embodiments, these adjustments may include modifications to the transmission path used in delivery of the telemetry, such as through changes to the telemetry chain included in the telemetry definition, such as to adjust the ordering of a voiceprint or biometric designation of telemetry within the chain towards the start of the telemetry chain, thus adjusting the transmission of this data through low-latency, side-band signaling pathways.

In some embodiments, the adaptive telemetry orchestrator operating on the IHS determines whether each transmission of telemetry is subject to a security delay. In such embodiments, the participating generators and collectors of telemetry, such as sensor hub 150 and sensors 160, at 550, interface with the adaptive telemetry orchestrator in identify telemetry that is ready for transmission. In response, the adaptive telemetry orchestrator determines whether to delay transmission of the telemetry due to a security delay. In some embodiments, both of the these determinations may be based on the categorization of the telemetry and/or where that telemetry categorization is positioned in the telemetry chain of the IHS.

In some embodiments, at 555, the adaptive telemetry orchestrator determines a categorization of the telemetry (e.g., indicators-of-attack, operational, core, user-presence, security, error, bulk, personal data, auxiliary, etc.) and consults the operative telemetry definition in determining whether the telemetry is subject to a security delay. As described, the telemetry chain specifies an ordered categorization of telemetry that may be transmitted by an IHS 100, 200 in support of the zero-trust computing environment. One of these categories of the telemetry chain may be designated as telemetry that is subject to a security delay, regardless of its position in the telemetry chain, such as a designation for indicator-of-attack telemetry.

In some embodiments, the telemetry chain may be used in determining whether collected telemetry is subject to a security delay. In some embodiments, the adaptive telemetry orchestrator may identify the position in the telemetry chain for the category of the telemetry to be transmitted, with a position at the start of the chain intended for telemetry to be transmitted without a delay and a position at the end of the chain intended for telemetry to be subject to a security delay. For instance, when the telemetry chain specifies error telemetry as the first element, the adaptive telemetry orchestrator responds to the identification of error telemetry that is ready for transmission by designating that telemetry for delivery without delay. When the telemetry chain is modified and error telemetry is moved to end of the telemetry chain, identified error telemetry is instead subject to a security delay. In scenarios where error telemetry is in the middle of the telemetry chain, the adaptive telemetry orchestrator may subject the telemetry to a security delay based on bandwidth availability in each channel and/or based on the priority associated with that particular telemetry, such as error telemetry indicating a critical error. In this manner, portions of the telemetry may be included in the delayed telemetry that is queued by the telemetry orchestrator, where telemetry categories below the indicators-of-attack category in the telemetry chain may be delayed in the same manner as indicator-of-attack telemetry, and only critical and diagnostic telemetry is collected.

At 560, the telemetry orchestrator determines whether the a security delay is already in place, or whether the telemetry definition specifies a new security delay, such as an updated security delay that is being issued in order to evaluate the updated remediation procedures that are included in that telemetry definition update. If there is no security delay in place and none is specified in the telemetry definition, at 565, the telemetry is transmitted. In some embodiments, the signal pathway selected by the adaptive telemetry orchestrator for transmission may be based on the telemetry chain position of that telemetry, even though the actual transmission may be conducted by the adaptive telemetry orchestrator, the sensor 160 generating the telemetry, or a collector of telemetry (e.g., sensor hub 150). In this manner, embodiments may adjust the telemetry security delays without detailed knowledge of the actual telemetry capabilities of an IHS.

In scenarios where a security delay is in place, or the updated telemetry definition specifies a new security delay, at 570, the telemetry orchestrator adds the telemetry to an appropriate queue of telemetry that is being held for the duration of the security delay. In some embodiments, the telemetry orchestrator may support multiple queues. In some embodiments, different queues may be used in the delayed delivery of different streams or categorizations of telemetry, in which case different security delay durations may be used for each stream or categorization of telemetry. In some embodiments, separate queues may be used for different security delay instances that are in effect at the same time. Such overlapping security delays may be utilized in support of targeted remediation procedures by the telemetry orchestrator.

As indicated in FIG. 5, at 575, the telemetry orchestrator determines that the security delay has expired and, at 580, the queued telemetry is delivered. As described, different queues of telemetry may be directed, based on the telemetry definition, to different policy information point destinations that provide specialized analytical capabilities for assessing a security delay based in part on the queued telemetry that is delivered upon expiration of the security delay. In addition, based on the telemetry that was not queued and that was delivered during the security delay, the queued telemetry may be assessed to determine whether the indicators-of-attack have been addressed by the remediation procedures set forth in the telemetry definition, including the modifications to the collection and transmission of telemetry, thus allowing the policy information point to discern whether aspects of the telemetry system are contributors to indicator of attack notifications.

In embodiments, adjusting telemetry collection back to prior settings or to new settings may be accomplished through dispatch of updated telemetry definitions. For instance, in response to a notification from the policy information point 345 that the validation failure has been resolved (such as through restoring a hardware component to a prior operating state), the policy decision point 335 issues updated telemetry definitions that may revert telemetry collection to prior settings. In some embodiments, the policy decision point 335 may issue updated telemetry definitions that specify more targeted telemetry collection. For instance, in a scenario where a validation failure with respect to a storage drive has triggered an increase in telemetry with respect all replaceable hardware components, adjustments in telemetry may instead focus the increased telemetry only on the storage drive reporting the validation failure.

In this manner, embodiments may quickly adjust telemetry in response to detected validation failures through the distribution of updated telemetry definitions, and to easily revert or continue adjusting the collection of telemetry as detected conditions continue to evolve. Even when providing support for configuring telemetry streams, existing telemetry systems are typically used statically due to the cumbersome manual requirements that are required to configure telemetry for a specific purpose (such as for increasing telemetry with respect only to a specific IHS or for a specify type of IHS) and then to adjust or revert these changes. In embodiments, telemetry adjustments can be quickly applied with regard to the signaling pathways that are used for different telemetry chain categories of telemetry data, and then quickly reverted when conditions change.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below.

Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for collection of telemetry by an Information Handling System (IHS), the system comprising:
a policy decision point of a zero-trust computing environment that controls access to a plurality of protected resources, wherein the policy decision point is configured to:
receive notification of an indication of attack related to the IHS;
identify a telemetry definition specifying telemetry being collected by the IHS;
update the telemetry definition to specify a security delay for telemetry related to the indication of attack;
transmit the updated telemetry definition to the IHS; and
the IHS comprising a plurality of sensors, one or more processors, and a memory coupled to the processors, the memory storing program instructions that, upon execution by the processors, cause the IHS to:
identify telemetry that is ready for transmission by the IHS;
determine whether the telemetry is subject to a security delay specified in the updated telemetry definition;
when the telemetry is subject to a security delay, queue the telemetry that is ready for transmission; and
transmit the queued telemetry to one or more destinations specified in the updated telemetry definition upon expiration of the security delay.

2. The system of claim 1, wherein the IHS comprises a remote access controller that identifies the telemetry that is ready for transmission by the IHS.

3. The system of claim 2, wherein the remote access controller implements one or more queues for the telemetry queued during a security delay.

4. The system of claim 1, wherein the updated telemetry definition specifies a duration for the security delay.

5. The system of claim 1, wherein the telemetry definition comprises a telemetry chain of ordered telemetry categories supported by the IHS, and wherein the telemetry categories in the telemetry chain include indicator-of-attack telemetry.

6. The system of claim 5, wherein the IHS is further configured to determine whether to queue the telemetry that is ready for transmission based on a position of the telemetry within the telemetry chain relative to the indicator-of-attack telemetry category in the telemetry chain.

7. The system of claim 6, wherein the telemetry is queued when its position in the telemetry chain is nearer to the end of the telemetry chain than the indicator-of-attack telemetry category.

8. The system of claim 1, wherein the telemetry definition further specifies an adjustment to a frequency of telemetry collection by the IHS.

9. The system of claim 1, wherein the telemetry definition further specifies an adjustment to telemetry collected by a hardware component that is associated with the indication of attack.

10. The system of claim 1, wherein the telemetry definition further specifies an adjustment to telemetry collected related to a user that is associated with the indication of attack.

11. A method for collection of telemetry by an Information Handling System (IHS), the method comprising:
receiving, by a policy decision point of a zero-trust computing environment that controls access to a plurality of protected resources, notification of an indication of attack related to the IHS;
identifying, by the policy decision point, a telemetry definition specifying telemetry being collected by the IHS;
updating, by the policy decision point, the telemetry definition to specify a security delay;
transmitting, by the policy decision point, the updated telemetry definition to the IHS;
identifying telemetry that is ready for transmission by the IHS;
determining, by the IHS, whether the telemetry is indicator-of-attack telemetry that is subject to a security delay specified in the updated telemetry definition received from the policy decision point,
when the telemetry is indicator-of-attack telemetry that is subject to a security delay, queueing, by the IHS, the telemetry that is ready for transmission; and
transmitting, by the IHS, the queued telemetry to one or more destinations specified in the updated telemetry definition upon expiration of the security delay.

12. The method of claim 11, wherein the IHS comprises a remote access controller that identifies the telemetry that is ready for transmission by the IHS.

13. The method of claim 12, wherein the remote access controller implements one or more queues for the telemetry queued during a security delay.

14. The method of claim 11, wherein the updated telemetry definition specifies a duration for the security delay.

15. The method of claim 11, wherein the telemetry definition comprises a telemetry chain of ordered telemetry categories supported by the IHS, and wherein the telemetry categories in the telemetry chain include indicator-of-attack telemetry.

16. An Information Handling System (IHS) supporting adaptive telemetry transmissions, the IHS comprising:
one or more processors;
a memory coupled to the processors, the memory storing program instructions that, upon execution by the processors, cause the IHS to:

receive, from a policy decision point of a zero-trust computing environment that controls access to a plurality of protected resources, a telemetry definition specifying telemetry to be collected by the IHS, wherein the telemetry definition specifies a security delay for a portion of the telemetry to be collected by the IHS;

identifying telemetry that is ready for transmission by the IHS;

determining, by the IHS, whether the telemetry is indicator-of-attack telemetry that is subject to a security delay specified in the updated telemetry definition received from the policy decision point, when the telemetry is indicator-of-attack telemetry that is subject to a security delay, queueing, by the IHS, the telemetry that is ready for transmission; and transmitting, by the IHS, the queued telemetry to one or more destinations specified in the updated telemetry definition upon expiration of the security delay.

17. The IHS of claim 16, further comprising a remote access controller that identifies the telemetry that is ready for transmission by the IHS.

18. The IHS of claim 17, wherein the remote access controller implements one or more queues for the telemetry queued during a security delay.

19. The IHS of claim 16, wherein the updated telemetry definition specifies a duration for the security delay.

20. The IHS of claim 16, wherein the telemetry definition comprises a telemetry chain of ordered telemetry categories supported by the IHS, and wherein the telemetry categories in the telemetry chain include indicator-of-attack telemetry.

* * * * *